US007545852B2

(12) United States Patent
Fernandez-Corbaton et al.

(10) Patent No.: US 7,545,852 B2
(45) Date of Patent: Jun. 9, 2009

(54) SYSTEM AND METHOD FOR ADJUSTING COMBINER WEIGHTS USING AN ADAPTIVE ALGORITHM IN WIRELESS COMMUNICATIONS SYSTEM

(75) Inventors: Ivan Jesus Fernandez-Corbaton, Nuremberg (DE); John Edward Smee, San Diego, CA (US); Srikant Jayaraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/564,824

(22) Filed: Nov. 29, 2006

(65) Prior Publication Data

US 2007/0086513 A1    Apr. 19, 2007

Related U.S. Application Data

(63) Continuation of application No. 09/860,705, filed on May 17, 2001, now Pat. No. 7,170,924.

(51) Int. Cl.
*H04B 1/707* (2006.01)
(52) U.S. Cl. .................................... 375/148
(58) Field of Classification Search ............ 375/148, 375/130, 144, 147, 232, 229, 140; 708/322, 708/319; 370/335, 342, 441; 333/18, 28 R
See application file for complete search history.

(56) References Cited

U.S. PATENT DOCUMENTS

| 4,901,307 | A | 2/1990 | Gilhousen et al. |
|---|---|---|---|
| 5,056,109 | A | 10/1991 | Gilhousen et al. |
| 5,103,459 | A | 4/1992 | Gilhousen et al. |
| 5,109,390 | A | 4/1992 | Gilhousen et al. |
| 5,245,629 | A | 9/1993 | Hall |
| 5,396,516 | A | 3/1995 | Padovani et al. |
| 5,406,588 | A | 4/1995 | Birchler et al. |
| 5,414,796 | A | 5/1995 | Jacobs et al. |
| 5,416,797 | A | 5/1995 | Gilhousen et al. |

(Continued)

FOREIGN PATENT DOCUMENTS

CN    1277759    12/2000

(Continued)

OTHER PUBLICATIONS

Haykin, Simon, "Adaptive Filter Theory," Communications Research Laboratory, McMaster University; 3rd Ed. Prentice Hall 1996, Chap. 13 pp. 562-588.

(Continued)

*Primary Examiner*—Tesfaldet Bocure
(74) *Attorney, Agent, or Firm*—Rupit M. Patel; James K. O'Hare

(57) ABSTRACT

Method and apparatus to compute the combiner coefficients for wireless communication systems using an adaptive algorithm. One embodiment trains the weights on a signal known a priori that is time multiplexed with other signals, such as a pilot signal in a High Data Rate, HDR, system, wherein the signal is transmitted at full power. The adaptive algorithm recursively computes the weights during the pilot interval and applies the weights generated to the traffic signals. In one embodiment, the algorithm is a recursive least squares algorithm employing a transversal filter and weight calculation unit.

13 Claims, 17 Drawing Sheets

U.S. PATENT DOCUMENTS

| | | | |
|---|---|---|---|
| 5,440,582 A | 8/1995 | Birchler et al. | |
| 5,548,808 A | 8/1996 | Bruckert et al. | |
| 5,559,790 A | 9/1996 | Yano et al. | |
| 5,566,165 A | 10/1996 | Sawahashi et al. | |
| 5,566,206 A | 10/1996 | Butler et al. | |
| 5,568,483 A | 10/1996 | Padovani et al. | |
| 5,577,025 A | 11/1996 | Skinner et al. | |
| 5,603,096 A | 2/1997 | Gilhousen et al. | |
| 5,652,765 A * | 7/1997 | Adachi et al. | 375/211 |
| 5,721,754 A | 2/1998 | Chen | |
| 5,754,533 A | 5/1998 | Bender et al. | |
| 5,757,853 A * | 5/1998 | Tsujimoto | 375/141 |
| 5,774,496 A | 6/1998 | Butler et al. | |
| 5,809,020 A * | 9/1998 | Bruckert et al. | 370/335 |
| 5,812,542 A * | 9/1998 | Bruckert et al. | 370/335 |
| 5,838,742 A | 11/1998 | Abu-Dayya | |
| 5,881,057 A | 3/1999 | Komatsu | |
| 5,903,554 A | 5/1999 | Saints | |
| 5,982,327 A * | 11/1999 | Vook et al. | 342/380 |
| 5,999,560 A | 12/1999 | Ono | |
| 6,032,026 A | 2/2000 | Seki et al. | |
| 6,069,912 A * | 5/2000 | Sawahashi et al. | 375/142 |
| 6,088,383 A | 7/2000 | Suzuki et al. | |
| 6,115,406 A * | 9/2000 | Mesecher | 375/130 |
| 6,137,785 A * | 10/2000 | Bar-Ness | 370/328 |
| 6,141,334 A | 10/2000 | Flanagan et al. | |
| 6,141,393 A * | 10/2000 | Thomas et al. | 375/347 |
| 6,175,588 B1 * | 1/2001 | Visotsky et al. | 375/148 |
| 6,192,040 B1 | 2/2001 | Jalloul et al. | |
| 6,215,814 B1 * | 4/2001 | Ylitalo et al. | 375/148 |
| 6,222,498 B1 | 4/2001 | Ishii et al. | |
| 6,278,726 B1 * | 8/2001 | Mesecher et al. | 375/148 |
| 6,304,750 B1 * | 10/2001 | Rashid-Farrokhi et al. | 455/137 |
| 6,366,607 B1 * | 4/2002 | Ozluturk et al. | 375/152 |
| 6,529,545 B2 * | 3/2003 | Tiirola et al. | 375/148 |
| 6,618,433 B1 | 9/2003 | Yellin | |
| 6,661,832 B1 | 12/2003 | Sindhushayana et al. | |
| 6,842,442 B2 * | 1/2005 | Okawa et al. | 370/335 |
| 7,076,264 B2 | 7/2006 | Bender et al. | |

FOREIGN PATENT DOCUMENTS

| | | |
|---|---|---|
| EP | 0631399 | 12/1994 |
| EP | 0668662 | 8/1995 |
| EP | 0776105 | 5/1997 |
| EP | 0806844 | 11/1997 |
| EP | 0892504 | 1/1999 |
| JP | 11-239080 | 8/1999 |
| WO | 9604718 | 2/1996 |
| WO | 9820617 | 5/1998 |
| WO | 0016494 | 3/2000 |
| WO | 0077938 | 12/2000 |
| WO | 0101595 | 1/2001 |
| WO | 0113530 | 2/2001 |

OTHER PUBLICATIONS

Haykin, Simon, "Adaptive Filter Theory," Communications Research Laboratory, McMaster University; 3rd Ed. Prentice Hall 1996, Chap. 9, pp. 365-389.

International Search Report-PCT/US02/015403, International Search Authority, European Patent Office Sep. 23, 2002.

International Preliminary Examination Report PCT/US2002/015403, IPEA/US, Nov. 12, 2003.

* cited by examiner $$R_{xx,I} = \begin{bmatrix} E_{TOTAL-1} & E_{CROSS} \\ E_{CROSS}^* & E_{TOTAL-2} \end{bmatrix}$$

$$x_1[n] = I_1[n] + jQ_1[n]$$
$$x_2[n] = I_2[n] + jQ_2[n]$$

$$E_{CROSS} = \frac{1}{N}\left(\sum_{n=1}^{N} I_1 I_2 + \sum_{n=1}^{N} Q_1 Q_2 + j\left(\sum Q_1 I_2 + \sum I_1 Q_2\right)\right)$$

$$E_{TOTAL} = \frac{1}{N}\left(\sum_{n=1}^{N} I^2 + \sum_{n=1}^{N} Q^2\right)$$

$$R_{nn} = R_{xx} - \underline{cc}^H$$

$$\underline{w} = R_{nn}^{-1}\underline{c}$$

FIG. 12A

$$\begin{bmatrix} [PATH1] & 0 & 0 \\ 0 & [PATH2] & 0 \\ 0 & 0 & [PATH3] \end{bmatrix}$$

FIG. 12B

SYSTEM AND METHOD FOR ADJUSTING COMBINER WEIGHTS USING AN ADAPTIVE ALGORITHM IN WIRELESS COMMUNICATIONS SYSTEM

CLAIM OF PRIORITY UNDER 35 U.S.C. §120

The present Application for Patent is a Continuation and claims priority to Pat. application No. 09/860,705 entitled "System and Method for Adjusting Combiner Weights Using an Adaptive Algorithm in a Wireless Communications System" filed May 17, 2001, now U.S. Pat. No. 7,170,924, issued Jan. 30, 2007, and assigned to the assignee hereof and hereby expressly incorporated by reference herein.

REFERENCE TO CO-PENDING APPLICATION FOR PATENT

The present invention is related to a co-pending U.S. Application for Patent entitled "SYSTEM AND METHOD FOR PROVIDING AN ACCURATE ESTIMATION OF RECEIVED SIGNAL INTERFERENCE FOR USE IN WIRELESS COMMUNICATIONS SYSTEMS" by Nagabhushana Sindhushayana et al., having U.S. Pat. No. 6,661,832, issued Dec. 9, 2003, and assigned to the assignee hereof, and "SYSTEM AND METHOD FOR RECEIVED SIGNAL PREDICTION IN WIRELESS COMMUNICATIONS SYSTEMS" by John E. Smee, et al., having U.S. Pat. No. 6,990,137, issued Jan. 24, 2006 and assigned to the assignee hereof.

FIELD

The present invention relates to communications systems. Specifically, the present invention relates to methods of decoding a received signal in a wireless communications systems.

BACKGROUND

In a wireless communications system the transmitted signal is altered by the transmission channel, as well as the receiver processing operations, such as filtering, demodulating, etc. For accurate communications, the receiver must consider these influences in decoding the received data. The receiver determines a relationship between a transmitted signal and a received signal. The relationship may then be applied to subsequent received signals. The relationship may be referred to as a "signature," wherein the various influences that alter a transmission signal are included in the signature.

Application of the signature to the received signal typically involves complex matrix operations. Various techniques have been developed to simplify the problem by adopting various assumptions. Often these assumptions refer to the noise energy. While some assumptions hold true for transmissions in one type of wireless system, others do not. There is a need therefore for accurate and efficient determination of received signals.

SUMMARY

According to one aspect, in a wireless communication system having a plurality of receive antennas and a combiner for combining signals received on the plurality of receive antennas, a method for determining combiner weights applied in the combiner, includes receiving a first signal at a first antenna of the plurality of receive antennas, receiving a second signal at a second antenna of the plurality of receive antennas, wherein the second signal is a function of the first signal, and determining a first weight in the combiner based on the first and second signals, the first weight associated with the first and second signal.

In another aspect, a remote station apparatus includes a first rake receiver having a plurality of fingers, a second rake receiver having a plurality of fingers, and a first path processing unit coupled to one of the plurality of fingers of the first rake receiver, and one of the plurality of fingers of the second rake receiver.

BRIEF DESCRIPTION OF THE DRAWINGS

FIG. 12 is an autocorrelation matrix used to determine combiner weights for use with a rake receiver.

DETAILED DESCRIPTION

Figure 1:
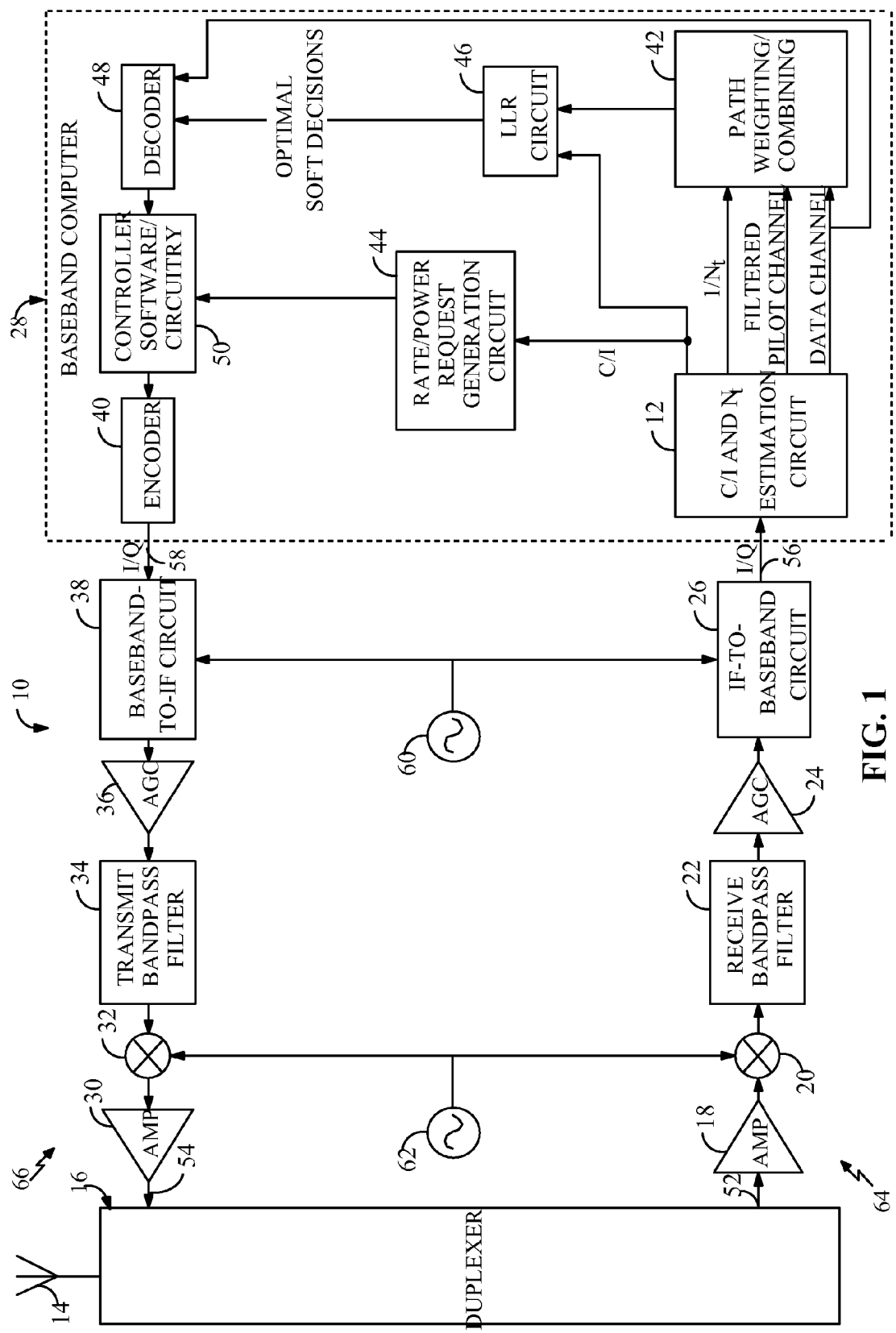
FIG. 1 is a telecommunications system having an accurate interference energy computation circuit.

Wireless communications systems are characterized by a plurality of mobile stations in communication with one or more base stations. Signals are transmitted between a base station and one or more mobile stations over a channel. Receivers in the mobile stations and base stations must estimate noise introduced to the transmitted signal by the channel to effectively decode the transmitted signal.

In a spread spectrum system, such as a Code Division Multiple Access, CDMA, communications system, signals are spread over a wide bandwidth via the use of a code, such as a Pseudorandom Noise, PN, spreading sequence. When the spread signals are transmitted over a channel, the signals take multiple paths from the base station to the mobile station. The signals are received from the various paths at the mobile station, decoded, and constructively recombined via path-combining circuitry such as a rake receiver. The path-combining circuitry applies gain factors, called weights, to each decoded path to maximize throughput and compensate for path delays and fading.

The rake structure is extensively used in digital communications receivers, particularly in mobile communications, due to its simplicity and robustness. The idea behind the rake is very simple and can be broadly stated as: (1) finding the time of arrival of the different paths; (2) assigning individual correlators (commonly called "fingers") to those times of arrival; and (3) combining the outputs of the individual correlators to form the final symbol estimate, which typically results in a weighted sum over all active fingers of the per-finger symbol estimate.

Given a set of time offsets, there exists an optimal set of weights that will maximize the Signal-to-Interference and Noise Ratio, SINR, of the final symbol estimate. In a non-stationary radio-channel, optimal time offsets and weights will vary with time; hence both sets of parameters are computed dynamically in the receiver. The traditional method for obtaining the weight vector for given time offsets is called Maximum Ratio Combining, MRC, and it has the inherent assumption that the interference on different fingers (every finger output will consist of desired signal plus interference) is uncorrelated from finger to finger.

Often, a communications system transmission includes pilot interval, a power control interval, and a data interval. During the pilot interval, the base station transmits a pre-established reference signal to the mobile station. The mobile station combines information from the received reference signal, i.e., pilot signal, and the transmitted pilot signal to extract information about the channel, such as channel interference and Signal-to-Noise Ratio, SNR. The mobile station analyzes the characteristics of the channel and subsequently transmits a power control signal to the base station in response thereto during a subsequent power control interval. For example, if the base station is currently transmitting with excess power given the current channel characteristics, the mobile station sends a control signal to the base station requesting that the transmitted power level be reduced. Note that in one embodiment of a packetized data transmission system, referred to generally as a High Data Rate, HDR, system has a time-gated pilot, wherein the pilot information is exclusively available separate from the traffic signals.

Digital communications systems often use Log-Likelihood Ratios, LLRs, to accurately decode a received signal. An SNR measurement or estimate is typically used to accurately calculate the LLR for a received signal. Accurate SNR estimates require precise knowledge of the noise characteristics of the channel, which may be estimated via the use of a pilot signal.

The rate or power at which a base station or mobile station broadcasts a signal is dependant on the noise characteristics of the channel. For maximum capacity, transceivers in the base stations and mobile stations control the power of transmitted signals in accordance with an estimate of the noise introduced by the channel. If the estimate of the noise, i.e., the interference spectral density of different multipath components of the transmitted signal is inaccurate, the transceivers may broadcast with too much or too little power. Broadcasting with too much power may result in inefficient use of network resources, resulting in a reduction of network capacity and a possible reduction in mobile station battery life. Broadcasting with too little power may result in reduced throughput, dropped calls, reduced service quality, and disgruntled customers.

The word "exemplary" is used exclusively herein to mean "serving as an example, instance, or illustration." Any embodiment described herein as "exemplary" is not necessarily to be construed as preferred or advantageous over other embodiments.

The "TIA/EIA/IS-95 Mobile Station-Base Station Compatibility Standard for Dual-Mode Wideband Spread Spectrum Cellular System," hereinafter referred to as "the IS-95 standard," and the "TIA/EIA/IS-2000 Standards for cdma2000 Spread Spectrum Systems," hereinafter referred to as "the cdma2000 standard," detail spread spectrum CDMA systems. Further, operation of a CDMA system is described in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present application for patent and hereby expressly incorporated by reference.

One type of communication system adapted for data transmissions, referred to as an HDR subscriber system is detailed in the "TIA/EIA/IS-856 cdma2000 High Rate Packet Data Air Interface Specification," hereinafter referred to as "the HDR standard" details an HDR system. Within the context of an HDR system, an access terminal, AT, may be mobile or stationary, and may communicate with one or more HDR base stations, referred to herein as modem pool transceivers, MPTs. An access terminal transmits and receives data packets through one or more modem pool transceivers to an HDR base station controller, referred to herein as a modem pool controller, MPC.

Modem pool transceivers and modem pool controllers are parts of a network called an Access Network, AN. An access network transports data packets between multiple access terminals. The access network may be further connected to additional networks outside the access network, such as a corporate intranet or the Internet, and may transport data packets between each access terminal and such outside networks.

An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

In a spread spectrum system, such as CDMA wireless communication systems, and specifically such as HDR systems, it is desirable to implement a rake receiver to achieve time-diversity for processing the received signal and the echoes or multipaths generated by transmission of the signal. The air interface channels in a CDMA wireless system become dispersive as a result of multipath signal propagations that differ from one another by more than one spreading chip duration allowing independent demodulation using a rake receiver.

Additionally, generally, buildings and other obstacles in built-up areas scatter the signal. Furthermore, because of the interaction between the several incoming waves, the resultant signal at the antenna is subject to rapid and deep fading. Average signal strength can be 40 to 50 dB below the free-space path loss. Fading is most severe in heavily built-up areas in an urban environment. In these areas, the signal envelope follows a Rayleigh distribution over short distances and a log-normal distribution over large distances.

The use of a rake receiver is described in detail in U.S. Pat. No. 5,109,390, entitled "Diversity Receiver in a CDMA Cellular Telephone System", assigned to the assignee of the present invention and hereby expressly incorporated by reference herein. Rake receivers process the individual multipath signals and combine them to form a composite signal. Rake receivers may exploit both the spatial and temporal diversities of a wireless system. The temporal diversities arise as the signal is altered by the air interface over time, thus creating multipaths. The rake receiver takes advantage of such temporal diversity by processing signals according to arrival time and effectively re-combining the energy from each time-varying multipath propagation.

In addition to the implementation of a rake receiver, wireless systems often employ diversity techniques of improving the SNR of a received signal. Diversity reception refers to the combining of multiple signals in order to improve the SNR of a communication. Time diversity is used to improve system performance for IS-95 CDMA systems. Diversity reception techniques are used to reduce the effects of fading and improve the reliability of communication without increasing either the transmitter's power or the channel bandwidth.

The basic idea of diversity receptions is that, if two or more independent samples of a signal are taken, these samples will fade in an uncorrelated manner. This means that the probability of all the samples being simultaneously below a given level is much lower than the probability of any individual sample being below that level. The probability of M samples all being simultaneously below that level is $p^M$, where p is the probability that a single sample is below that level. Thus, it is clear that a signal composed of a suitable combination of the various samples will have much less severe fading properties than any individual sample.

In principle, diversity reception techniques can be applied either at the base station or at the mobile station, although each type of application has different problems that must be addressed. The cost of the diversity combiner can be high, especially if multiple receivers are required. Also the power output of the mobile station is limited by its battery life. The base station, however, can increase its power output or antenna height to improve coverage to a mobile station. Since the path between the mobile station and the base station is assumed to be reciprocal, diversity systems implemented in a mobile station work similarly to those in a base station.

Figure 14:
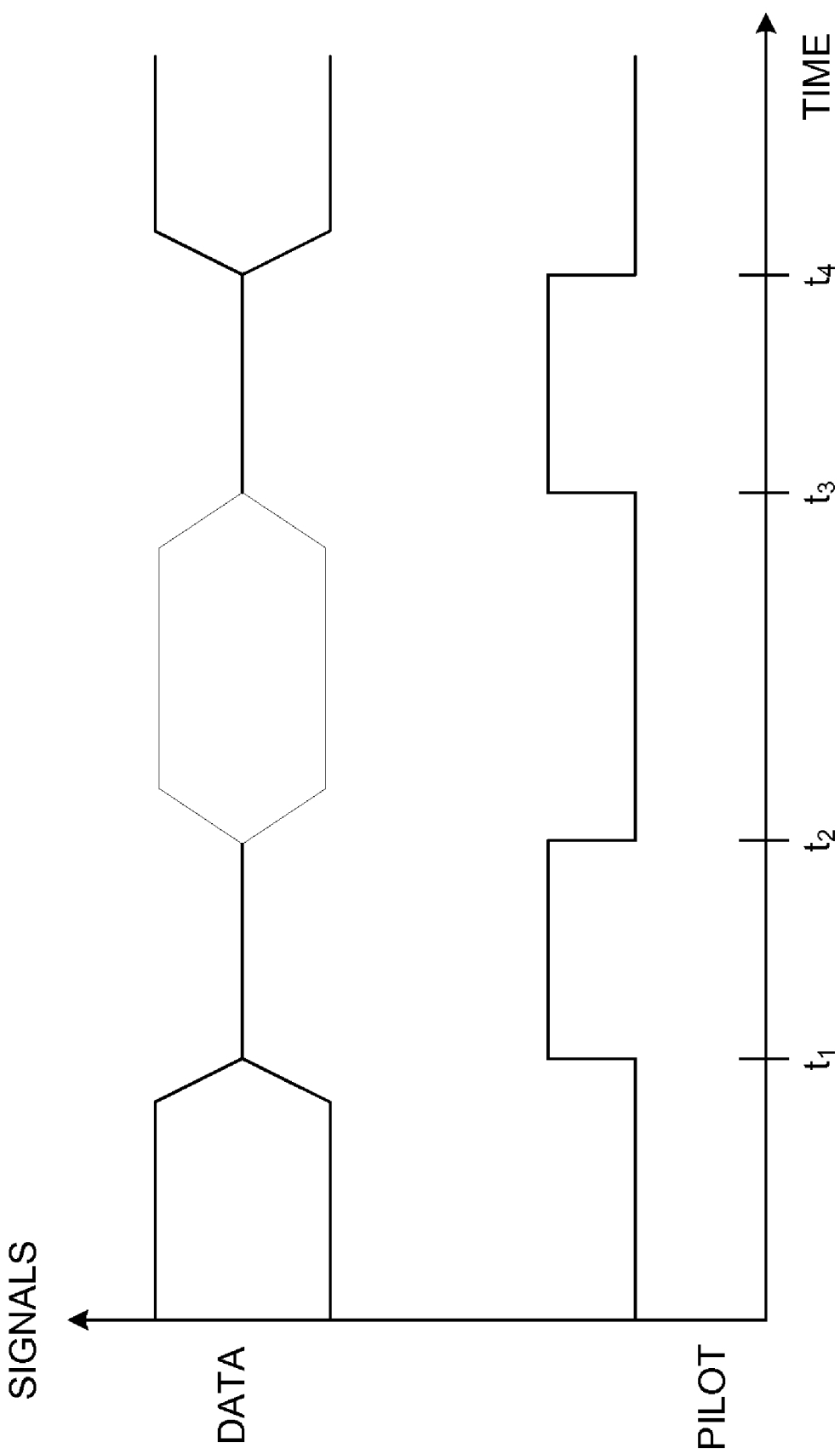
FIG. 14 is a timing diagram of channel allocation in a high data rate system.

It is desirable to use multiple receive antennas at a receiver to get space-diversity and solve for multipath fades in the received signal energy at each antenna. With a suitable choice of combiner weights, multiple receive antennas allow for interference suppression in the spatial domain. In particular, there is a need to compute the space-time combiner coefficients (i.e., for each rake finger of each receiver antenna) for wireless communication systems that use a CDMA waveform with a gated pilot signal transmitted at full power. A gated pilot signal used in an HDR system is illustrated in FIG. 14, wherein the pilot is periodically transmitted. As illustrated the pilot is transmitted during the intervals of $t_1$ to $t_2$ and $t_3$ to $t_4$. In the illustrated embodiment, the pilot is a sequence of logical ones spread by a PN sequence. Alternate embodiments may employ various pilot signals wherein the pilot scheme is known a priori at both the transmitter and receiver. While the pilot is inactive, the data or traffic is transmitted. The data signal may include a variety of other signals specific to the implementation of a given system. The full transmission power signals are available for both data and pilot as illustrated in FIG. 14.

In one embodiment, a system uses non-recursive methods of specifying Minimization of Mean Square Error, MMSE, combiner weights. The non-recursive computations of the combiner weights are based on computing correlation statistics during the pilot portion of the frame to form an estimate of the noise correlation matrix. The correlations are then averaged or filtered across multiple pilot bursts to trade-off noise suppression through averaging and the ability to track channel variations. In one embodiment, the combiner weights are calculated once per pilot burst by inverting the noise correlation matrix and multiplying the result by an estimate of the desired signal vector.

In an exemplary embodiment, the data information is extracted from the received signal by filtering and smoothing. A filter is a device in the form of a piece of physical hardware or software that is applied to a set of noisy data in order to extract information about a prescribed quantity of interest. The noise may arise from a variety of sources. For example, the data may have been derived by means of noisy sensors or may represent a useful signal component that has been corrupted by transmission through a communication channel.

A filter is designed to perform three basic information-processing tasks: filtering; smoothing; and prediction. Filtering means the extraction of information about a quantity of interest at time t by using data measured up to and including time t. Smoothing differs from filtering in that information about the quantity of interest need not be available at time t, and data measured later than time t can be used in obtaining this information. This means that in the case of smoothing there is a delay in producing the result of interest. In the smoothing process data is available from times after time t. In other words, not only data obtained up to time t but also data obtained after time t is available. Smoothing may be more accurate in some sense than filtering. Finally, prediction is the forecasting side of information processing. The aim here is to derive information about what the quantity of interest will be like at some (t+□ in the future, for some □>0, by using data measured up to and including time t.

Filters may be generally classified as linear and nonlinear. A filter is said to be linear if the filtered, smoothed, or predicted quantity at the output of the device is a linear function the observations applied to the filter input. Otherwise, the filter is nonlinear.

In a statistical approach to the solution of the linear filtering problem, assume the availability of certain statistical parameters (i.e., mean and correlation functions) of the useful signal and unwanted additive noise. A linear filter is designed to accept noisy data as input and minimize the effects of that noise at the filter output according to some statistical criterion. A useful approach to this filter-optimization problem is to minimize the mean-square value of the error signal that is defined as the difference between some desired response and the actual filter output, i.e. MMSE. For stationary inputs, the resulting solution is considered optimum in the mean-square sense. A plot of the mean-square value of the error signal versus the adjustable parameters of a linear filter is referred to as the error-performance surface. The minimum point of this surface represents the solution.

For those situations in which nonstationarity of the signal and/or noise is intrinsic to the problem, the optimum filter has to assume a time-varying form. Linear filter theory may be discussed for continuous-time, however, in practice the discrete-time representation is often preferred. In this method of representation, the input and output signals, as well as the characteristics of the filters themselves, are all defined at discrete instants of time. A continuous-time signal may be represented by a sequence of samples that are derived by observing the signal at uniformly spaced instants of time. No loss of information is incurred during this conversion process provided the sampling theorem is satisfied, wherein according to the sampling theorem, the sampling rate has to be greater than twice the highest frequency component of the continuous-time signal. Thus, the continuous-time signal u(t) may be represented by the sequence u(n),n=2, . . . , where for convenience the sampling period is normalized to unity.

The design of a filter generally uses a priori information about the statistics of the data to be processed. The filter is optimum only when the statistical characteristics of the input data match a priori information on which the design of the filter is based. When this information is not known completely it may be difficult to design the filter or else the design may no longer be optimum. A straightforward approach that may be used in such situations is the "estimate and plug" procedure. This is a two-stage process whereby the filter first "estimates" the statistical parameters of the relevant signals and then "plugs" the results so obtained into a nonrecursive formula for computing the filter parameters. For real-time operation, this procedure requires matrix inversion. An efficient method is to use an adaptive filter. By such a device it is meant one that is self-designing in that the adaptive filter relies for its operation on a recursive algorithm, which makes it possible for the filter to perform satisfactorily in an environment where complete knowledge of the relevant signal characteristics is not available.

Adaptive algorithms start from some predetermined set of initial conditions, representing whatever is known about the environment. Yet, in a stationary environment, it is found that after successive iterations of the algorithm it converges to the optimum solution in some statistical sense. In a nonstationary environment, the algorithm offers a tracking capability, in that it can track time variations in the statistics of the input data, provided that the variations are sufficiently slow.

As a direct consequence of the application of a recursive algorithm whereby the parameters of an adaptive filter are updated from one iteration to the next, the parameters become data dependent. This, therefore, means that an adaptive filter is in reality a nonlinear device, in the sense that it does not obey the principle of superposition. Notwithstanding this property, adaptive filters are commonly classified as linear or nonlinear. An adaptive filter is said to be linear if the estimate of a quantity of interest is computed adaptively (e.g. at the output of the filter) as a linear combination of the available set of observations applied to the filter input. Otherwise, the adaptive filter is said to be nonlinear.

A variety of recursive algorithms have been developed for the operation of linear adaptive filters. The choice of an algorithm for a particular application is based on any one of several parameters of the system. A first parameter is the rate of convergence, defined as the number of iterations required for the algorithm, in response to stationary inputs, to converge "close enough" to the optimum solution in the mean-square sense. A fast rate of convergence allows the algorithm to adapt rapidly to a stationary environment of the unknown statistics. A second parameter is called misadjustment. For an algorithm of interest, this parameter provides a quantitative measure of the amount by which the final value of the mean-squared error, averaged over an ensemble of adaptive filters, deviates from the minimum mean-squared error that is produced by the filter. A third parameter is tracking. When an adaptive filtering algorithm operates in a nonstationary environment, the algorithm is required to track statistical variations in the environment. The tracking performance of the algorithm, however, is influenced by two contradictory features: rate of convergence; and steady-state fluctuation due to algorithm noise.

An additional parameter is the robustness of the adaptive filter to small disturbances. For an adaptive filter to be robust, small disturbances (i.e., disturbances with small energy) can only result in small estimation errors. The disturbances may arise from a variety of factors, internal or external to the filter.

Further, computational requirements present several issues including: the number of operations (i.e., multiplications, divisions, and additions/subtractions) required to make one complete iteration of the algorithm; the size of the memory locations required to store the data and the program; and the investment required to program the algorithm in a computer.

Still another parameter is the structure of information flow in the algorithm. The structure determines the manner in which the algorithm is implemented in hardware. For example, an algorithm having a structure that exhibits high modularity, parallelism, or concurrency is well suited for implementation using Very Large-Scale Integration, VLSI.

Yet another parameter considers the numerical properties of the algorithm. When an algorithm is implemented numerically, inaccuracies are produced due to quantization errors. These errors are due to analog-to-digital conversion of the input data and digital representation of internal calculations. The digital representation causes serious design problems. There are two basic issues of concern: numerical stability; and numerical accuracy. Numerical stability is an inherent characteristic of an adaptive filtering algorithm. Numerical accuracy is determined by the number of bits used in the numerical representation of data samples and filter coefficients. An adaptive filtering algorithm is said to be numerically robust when it is insensitive to variations in the wordlength used in its digital implementation.

Adaptive filtering involves two basic processes: filtering a sequence of input data samples to produce an output response; and adaptive control of an adjustable set of parameters used in the filtering process.

As illustrated by the discussion provided hereinabove, a variety of methods may be used to increase the SNR of a received signal, including diversity techniques and the use of a rake receiver. In designing a particular system, often a trade-off is made between accuracy with cost and/or complexity. Hereinbelow are described a variety of methods for determining combiner weights for application in a rake receiver. Each method provides a balance of accuracy with cost and/or complexity for a variety of situations. First, MRC approaches are described, wherein assumptions regarding the noise energy of the received signal are made to simplify the computational complexity of combiner weight determination. Second, MMSE approaches are described, wherein alternate assumptions are made to further simplify the computation complexity of combiner weight determination. Third, an adaptive algorithm is described that effectively avoids matrix inversion calculations without using the assumptions of the other methods.

I. Maximal Ratio Combining

In one embodiment, in a wireless communication wherein a receiver employs a rake receiver, adaptive filtering is applied to calculate the combiner weights of the rake receiver.

Ideally, the calculation of combiner weights considers all of the energy present in the system, including multipaths, interference from other users, and noise energy. The complexity of such calculation has encouraged the use of simplifying assumptions. For example, one method of calculating combiner weights applies a Maximal Ratio Combining, MRC, scheme, wherein the weights are calculated specific to a path and antenna combination. In this way, for a system having A antennas and L paths, the (AL×AL) matrix describing the system is reduced to AL (1×1) matrices, wherein each path is assumed to have independent noise. An MRC generated weight is calculated for each path of each antenna.

FIG. 1 is a diagram of a telecommunications transceiver system having an accurate Carrier signal-to-Interference, C/I, and interference energy, $N_t$, computation circuit 12. The system 10 is adapted for use with a CDMA mobile station. In the present specific embodiment, signals received by the transceiver system 10 are received over a forward communications link between a base station (not shown) and the system 10. Signals transmitted by the transceiver system 10 are transmitted over a reverse communications link from the transceiver system 10 to the associated base station.

For clarity, many details of the transceiver system 10 have been omitted, such as clocking circuitry, microphones, speakers, and so on. Those skilled in the art can easily implement the additional circuitry without undue experimentation.

The transceiver system 10 is a dual conversion telecommunications transceiver and includes an antenna 14 connected to a duplexer 16. The duplexer 16 is connected to a receive path that includes, from left to right, a receive amplifier 18, a Radio Frequency, RF, to Intermediate Frequency, IF, mixer 20, a receive bandpass filter 22, a receive Automatic Gain Control circuit, AGC, 24, and an IF-to-baseband circuit 26. The IF-to-baseband circuit 26 is connected to a baseband computer 28 at the C/I and $N_t$ estimation circuit 12.

The duplexer 16 is also connected to a transmit path 66 that includes a transmit amplifier 30, an IF-to-RF mixer 32, a transmit bandpass filter 34, a transmit AGC 36, and a baseband-to-IF circuit 38. The transmit baseband-to-IF circuit 38 is connected to the baseband computer 28 at an encoder 40.

The C/I and $N_t$ estimation circuit 12 in the baseband computer 28 is connected to a path weighting and combining circuit 42, a rate/power request generation circuit 44, and a log-likelihood ratio (LLR) circuit 46. The LLR circuit 46 is also connected to the path weighting and combining circuit 42 and a decoder 48. The decoder 48 is connected to a controller 50 that is also connected to the rate/power request generation circuit 44 and the encoder 40.

The antenna 14 receives and transmits RF signals. A duplexer 16, connected to the antenna 14, facilitates the separation of receive RF signals 52 from transmit RF signals 54.

RF signals 52 received by the antenna 14 are directed to the receive path 64 where they are amplified by the receive amplifier 18, mixed to intermediate frequencies via the RF-to-IF mixer 20, filtered by the receive bandpass filter 22, gain-adjusted by the receive AGC 24, and then converted to digital baseband signals 56 via the IF-to-baseband circuit 26. The digital baseband signals 56 are then input to a digital baseband computer 28.

In the present embodiment, the receiver system 10 is adapted for use with Quadrature Phase Shift-Keying, QPSK, modulation and demodulation techniques, and the digital baseband signals 56 are Quadrature Amplitude Modulation, QAM, signals that include both In-phase (I) and Quadrature (Q) signal components. The I and Q baseband signals 56 represent both pilot signals and data signals transmitted from a CDMA telecommunications transceiver such as a transceiver employed in a base station. HDR type systems often use 8-PSK or 16-QAM modulation schemes.

In the transmit path 66, digital baseband computer output signals 58 are converted to analog signals via the baseband-to-IF circuit 38, mixed to IF signals, filtered by the transmit bandpass filter 34, mixed up to RF by the IF-to-RF mixer 32, amplified by the transmit amplifier 30 and then transmitted via the duplexer 16 and the antenna 14.

Both the receive and transmit paths 64 and 66, respectively, are connected to the digital baseband computer 28. The digital baseband computer 28 processes the received baseband digital signals 56 and outputs the digital baseband computer output signals 58. The baseband computer 28 may include such functions as signal to voice conversions and/or vise versa.

The baseband-to-IF circuit 38 includes various components (not shown) such as Digital-to-Analog Converters (DACs), mixers, adders, filters, shifters, and local oscillators. The baseband computer output signals 58 include both In-phase (J) and Quadrature (Q) signal components that are 90° out of phase. The output signals 58 are input to DACs in the analog baseband-to-IF circuit 38, where they are converted to analog signals that are then filtered by lowpass filters in preparation for mixing. The phases of the output signals 58 are adjusted, mixed, and summed via a 90° shifter (not shown), baseband-to-IF mixers (not shown), and an adder (not shown), respectively, included in the baseband-to-IF circuit 38.

The adder outputs IF signals to the transmit AGC circuit 36 where the gain of the mixed IF signals is adjusted in preparation for filtering via the transmit bandpass filter 34, mixing up to RF via the IF-to-transmit mixer 32, amplifying via the transmit amplifier 20, and eventual radio transmission via the duplexer 16 and the antenna 14.

Similarly, the IF-to-baseband circuit 26 in the receive path 64 includes circuitry (not shown) such as Analog-to-Digital Converters, ADCs, oscillators, and mixers. A received gain-adjusted signals output from the receive AGC circuit 24 are transferred to the IF-to-baseband circuit 26 where they are mixed to baseband via mixing circuitry and then converted to digital signals via ADCs.

Both the baseband-to-IF circuit 38 and the IF-to-baseband circuit 36 employ an oscillator signal provided via a first oscillator 60 to facilitate mixing functions. The receive RF-to-IF mixer 20 and the transmit IF-to-RF mixer 32 employ an oscillator signal input from a second oscillator 62. The first and second oscillators 60 and 6, respectively, may be implemented as phase-locked loops that derive output signals from a master reference oscillator signal.

Those skilled in the art will appreciate that other types of receive and transmit paths 64 and 66 may be employed instead without departing from the scope of the present invention. The various components such as amplifiers 18 and 30, mixers 20 and 32, filters 22 and 34, AGC circuits 24 and 36, and frequency conversion circuits 26 and 38 are standard components and may easily be constructed by those having ordinary skill in the art and access to the present teachings.

In the baseband computer 28, the received I and Q signals 56 are input to the C/I and $N_t$ estimation circuit 12. The C/I and $N_t$ estimation circuit 12 accurately determines the interference energy of the I and Q signals 56 based on the pilot signal and determines a carrier signal-to-interference ratio in response thereto. The C/I is similar to SNR and is the ratio of the energy of the received I and Q signals 56 less interference and noise components to the interference energy of the received I and Q signals 56. Conventional C/I estimation circuits often fail to accurately estimate the multipath interference energy.

The C/I and $N_t$ estimation circuit 12 outputs a C/I signal to the rate/power request generation circuit 44 and the LLR circuit 46. The C/I and $N_t$ estimation circuit 12 also outputs the reciprocal of the interference energy ($1/N_t$), a despread and decovered data channel signal, and a despread and decovered pilot channel signal to the path weighting and combining circuit 42. The despread and decovered data channel signal is also provided to the decoder 48 where it is decoded and forwarded to the controller 50. At the controller 50, the decoded signal is processed to output voice or data, or to generate a reverse link signal for transfer to the associated base station (not shown).

The path weighting and combining circuit 42 computes an optimal ratio path-combining weights for multipath components of the received data signal corresponding to the data channel signal under the given assumptions, weights the appropriate paths, combines the multiple paths, and provides the summed and weighted paths as a metric to the LLR circuit 46.

The LLR circuit 46 employs metrics from the path weighting and combining circuit 42 with the C/estimation provided by the C/I and N, estimation circuit 12 to generate an optimal LLR and soft decoder decision values. The optimal LLR and soft decoder decision values are provided to the decoder 48 to facilitate decoding of the received data channel signals. The controller 50 then processes the decoded data channel signals to output voice or data via a speaker or other device (not shown). The controller 50 also controls the sending of speech signals and data signals from an input device (not shown) to the encoder 40 in preparation for transmission.

The rate/power request generation circuit 44 generates a rate control or power fraction request message based on the C/I signal input from the C/I and $N_t$ estimation circuit 12. The rate/power request generation circuit 44 compares the C/I with a set of predetermined thresholds. The rate/power request generation circuit 44 generates a rate request or power control message based on the relative magnitude of the C/I signal with respect to the various thresholds. The exact details of the rate/power request generation circuit 44 are application-specific and easily determined and implemented by those ordinarily skilled in the art to suit the needs of a given application.

The resulting rate control or power fraction request message is then transferred to the controller 50. The controller 50 prepares the power fraction request message for encoding via the encoder 40 and eventual transmission to the associated base station (not shown) over a data rate request channel (DRC) via the transmit path 66, duplexer 16 and antenna 14. When the base station receives the rate control or power fraction request message, the base station adjusts the rate and/or power of the transmitted signals accordingly.

The accurate C/I and $N_t$ estimates from the C/I and $N_t$ estimation circuit 12 improve the performance of the rate/power request generation circuit 44 and improve the performance of the decoder 48, thereby improving the throughput and efficiency of the transceiver system 10 and associated telecommunications system.

Figure 2:
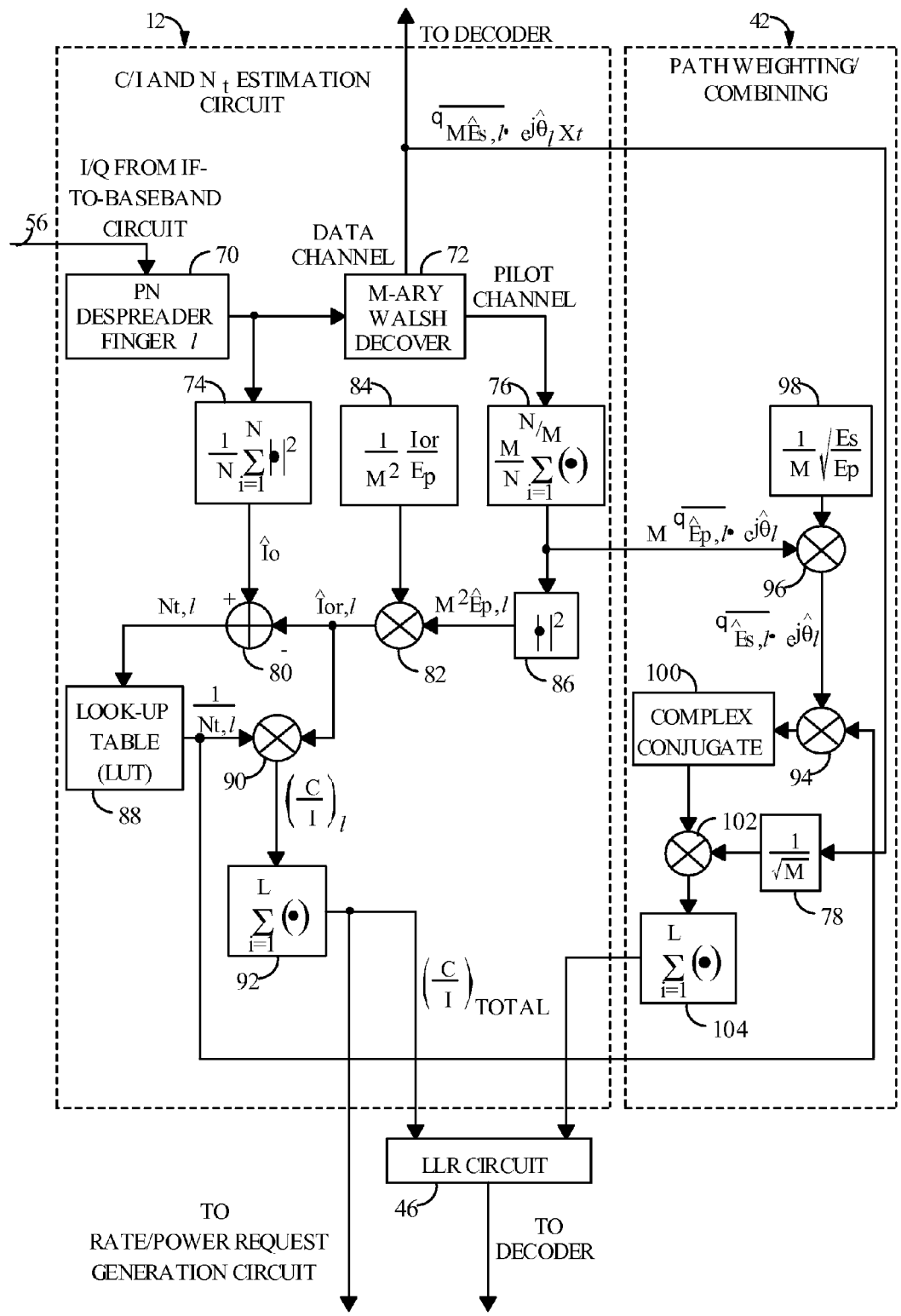
FIG. 2 is a detailed diagram of the accurate interference energy computation circuit, log-likelihood ratio (LLR) circuit, and path-combining circuit of FIG. 1 adapted for use with forward link transmissions.

FIG. 2 is a more detailed diagram of the accurate C/I and $N_t$ estimation circuit 12, LLR circuit 46, and path-combining circuit 42 of FIG. 1 adapted for use with forward link transmissions.

The C/I and $N_t$ estimation circuit 12 includes, from left to right and top to bottom, a PN despreader 70, an M-ary Walsh decover circuit 72, a total received signal energy, $I_o$ computation circuit 74, a first constant circuit 84, a pilot filter 76, a subtractor 80, a first multiplier 82, a pilot energy calculation circuit 86, a Look-Up Table, LUT, 88, a second multiplier 90, and a C/I accumulation circuit 92. In the C/I and $N_t$ estimation circuit 12, the PN despreader 70 receives the I and Q signals 56 from the IF-to-baseband circuit 26 of FIG. 1. The PN despreader 70 provides input, in parallel, to the M-ary Walsh decover circuit 72 and the $I_o$ computation circuit 74. The M-ary Walsh decover circuit 72 provides input to the pilot filter 76 and to a constant divider circuit 78 in the path weighting and combining circuit 42.

The output of the energy computation circuit 74 is connected to a positive terminal of the subtractor circuit 80. A negative terminal of the subtractor circuit 80 is connected to an output terminal of a first multiplier 82. A first input of the first multiplier 82 is connected to an output of the first constant circuit 84. A second input of the first multiplier 82 is connected to an output of the pilot energy calculation circuit 86. The pilot filter 76 provides input to the pilot energy calculation circuit 86.

An output of the subtractor 80 is connected to the LUT 88. An output of the LUT 88 is connected, in parallel, to a first input of the second multiplier 90 and a first input of a third multiplier 94 in the path weighting and combining circuit 42. A second input of the second multiplier 90 is connected to the output of the first multiplier 82. An output of the second multiplier 90 is connected to the C/I accumulator circuit 92, the output of which provides input to the LLR circuit 46.

The path weighting and combining circuit 42 includes a second constant generation circuit 98, a fourth multiplier 96, the third multiplier 94, the constant divider circuit 78, a complex conjugate circuit 100, a fifth multiplier 102, and a path accumulator circuit 104. In the path weighting and combining circuit 42, a first terminal of the fourth multiplier 96 is connected to the output of the pilot filter 76, which is also connected to an input of the pilot energy calculation circuit 86 in the C/I and $N_t$ estimation circuit 12. A second terminal of the fourth multiplier 96 is connected to the second constant generation circuit 98. An output of the fourth multiplier 96 is connected to a second input of the third multiplier 94. The output of the third multiplier 94 provides input to the complex conjugate circuit 100. The output of the complex conjugate circuit 100 is connected to a first input of the fifth multiplier 102. An output of the constant divider circuit 78 is connected to a second input of the fifth multiplier 102. An output of the fifth multiplier 102 is connected to an input of the path accumulator circuit 104. The output of the path accumulator circuit 104 is connected to a second input of the LLR circuit 46. The output of the LLR circuit is connected to an input of a decoder (see 48 of FIG. 1).

In operation, the PN despreader 70 receives the I and Q signals and despreads L fingers, i.e., paths (l). The PN despreader 70 despreads the I and Q signals using an inverse of the pseudo noise sequence used to spread the I and Q signals before transmission over the channel. The construction and operation of the PN despreader 70 is also well known in the art.

Despread signals are output from the PN despreader 70 and input to the M-ary Walsh decover 72 and the $I_o$ computation circuit 74. The $I_o$ computation circuit 74 computes the total received energy, $I_o$, per chip, which includes both a desired signal component and an interference and noise component. The $I_o$ computation circuit provides an estimate, $\hat{I}_o$, of $I_o$ in accordance with the following equation:

$$\hat{I}_o = \frac{1}{N} \sum_{i=1}^{N} |\bullet|^2, \qquad (1)$$

where N is the number of chips per pilot burst and is 64 in the present specific embodiment and ● represents the received despread signal output from the PN despreader 70.

Those skilled in the art will appreciate that the $I_o$ may be computed before despreading by the PN despreader 70 without departing from the scope of the present invention. For example, the $I_o$ computation circuit 74 may receive direct input from the I and Q signals 56 instead of input provided by the PN despreader 70, in which case an equivalent estimate of $I_o$ will be provided at the output of the $I_o$ computation circuit 74.

The M-ary Walsh decover circuit 72 decovers orthogonal data signals, called data channels, and pilot signals, called the pilot channel, in accordance with methods known in the art. In the present specific embodiment, the orthogonal data signals correspond to one data channel (s) that is represented by the following equation:

$$s = \sqrt{M \hat{E}_{s,l}} e^{j\hat{\theta}_l} X_l, \qquad (2)$$

where M is the number of chips per Walsh symbol, $\hat{E}_{s,l}$ is the modulation symbol energy of the $l^{th}$ multipath component, $\hat{\theta}_l$ is the phase of the data channel s, and $X_l$ is the information-baring component of the data channel s. The decovered data channel represented by equation (2) is provided to the decoder (see 48 of FIG. 1) and to the constant divider circuit 78 of the path weighting and combining circuit 42.

While the exemplary embodiment is illustrated as being adapted for use with signals comprising various Walsh codes, the present invention is easily adaptable for use with other types of codes by those ordinarily skilled in the art.

The pilot channel is input to the pilot filter 76. The pilot filter 76 is an averaging filter that acts as a lowpass filter, which removes higher frequency noise and interference components from the pilot channel. The output of the pilot filter 76 (p) is represented by the following equation:

$$p = M \sqrt{\hat{E}_{p,l}} e^{j\hat{\theta}_l}, \qquad (3)$$

where M is the number of chips per Walsh symbol, $\hat{E}_{p,l}$ is the pilot chip energy of the $l^{th}$ multipath component, and $\hat{\theta}_l$ is the phase of the filtered pilot channel p.

An estimate of the energy of the filtered pilot channel p is computed via the pilot energy calculation circuit 86, which is a square of the complex amplitude of the filtered pilot channel p represented by equation (3). The square of the complex amplitude of the filtered pilot channel p is multiplied by a predetermined scale factor c represented by the following equation:

$$c = \frac{1}{M^2} \frac{I_{or}}{E_p}, \qquad (4)$$

where $I_{or}$ is the received energy of the desired signal, i.e., is equivalent to $I_o$ less noise and interference components. $E_p$ is the pilot chip energy. The scale factor c is a known forward link constant in many wireless communications systems.

The scale factor c is multiplied by the energy of the filtered pilot signal p via the first multiplier 82 to yield an accurate estimate $\hat{I}_{or,l}$ of the energy of the received desired signal (Io less noise and interference components) associated with the $l^{th}$ multipath component of the received signals 56.

The accurate estimate $\hat{I}_{or,l}$ is subtracted from the estimate of $I_o$ via the subtractor 80 to yield an accurate measurement of the interference energy ($N_{t,l}$) associated with the $l^{th}$ multipath component. $N_{t,l}$ is then provided to the LUT 88, which outputs the reciprocal of $N_{t,l}$ to the third multiplier 94 in the path weighting and combining circuit 42 and to the first input of the second multiplier 90. The second input of the second multiplier 90 is connected to the output of the first multiplier 82, which provides $\hat{I}_{or,l}$ at the second input terminal of the second multiplier 90. The second multiplier 90 outputs an accurate estimate of the carrier signal-to-interference ratio or $(C/I)_l$ associated with the $l^{th}$ multipath component in accordance with the following equation:

$$\left(\frac{C}{I}\right)_l = \frac{\hat{I}_{or,l}}{N_{t,l}}. \qquad (5)$$

The accurate C/I value is then accumulated over L paths in the received signal via the C/I accumulator circuit 92. The accumulated C/I values are then provided to the LLR circuit 46 and to the rate/power request generation circuit (see 44 of FIG. 1).

In the path weighting and combining circuit 42, the fourth multiplier 96 multiplies the filtered pilot signal p by a constant k provided by the second constant generation circuit 98. The constant k is computed in accordance with the following equation:

$$k = \frac{1}{M} \sqrt{\frac{E_s}{E_p}}, \qquad (6)$$

where $E_s$ is the modulation symbol energy, $E_p$ is the pilot symbol energy, and M is the number of Walsh symbols per chip as mentioned above. The ratio of $E_s$ to $E_p$ is often a known constant for both reverse link and forward link transmissions.

The output of the fourth multiplier 96 provides an estimate of the channel coefficient ($\hat{\alpha}$) described by the following equation:

$$\hat{\alpha} = \sqrt{\hat{E}_{s,l}} e^{j\hat{\theta}_l}, \qquad (7)$$

where $\hat{E}_{s,l}$ is an estimate of the modulation symbol energy of the $l^{th}$ multipath component, $\hat{\theta}_l$ is an estimate of the phase of the pilot signal. The channel $\hat{\alpha}$ is a scaled estimate of the complex amplitude of the output of the pilot filter 76.

The channel estimate is then multiplied by the reciprocal of the interference energy $N_{t,l}$ associated with the $l^{th}$ multipath component by the third multiplier 94. The interference energy $N_{t,l}$ includes both interference and noise components. The complex conjugate circuit 100 then computes the conjugate of the output of the third multiplier 94, which represents maximal ratio path-combining weights. The maximal ratio path-combining weights are then multiplied by the corresponding data symbol output from the divider circuit 78 via the fifth multiplier 102. The data symbol (d) is represented by the following equation:

$$d = \sqrt{\hat{E}_{s,l}} e^{j\hat{\theta}_l} X_l, \qquad (8)$$

where the variables are as given for equations (2) and (7).

The output of the fifth multiplier 102 represents optimally weighted data signals that are then accumulated over the L paths that comprise the signals via the path combiner circuit 104. The resulting optimally combined data signals are provided to the LLR circuit 46, which facilitates the calculation of optimal soft decoder inputs to the decoder (see 48 of FIG. 1).

Those skilled in the art will appreciate that the constants c and k provided by the first constant generation circuit 84 and the second constant generation circuit 98, respectively, may be constants or variables other than those represented by equations (3) and (6) without departing from the scope of the present invention.

Figure 3:
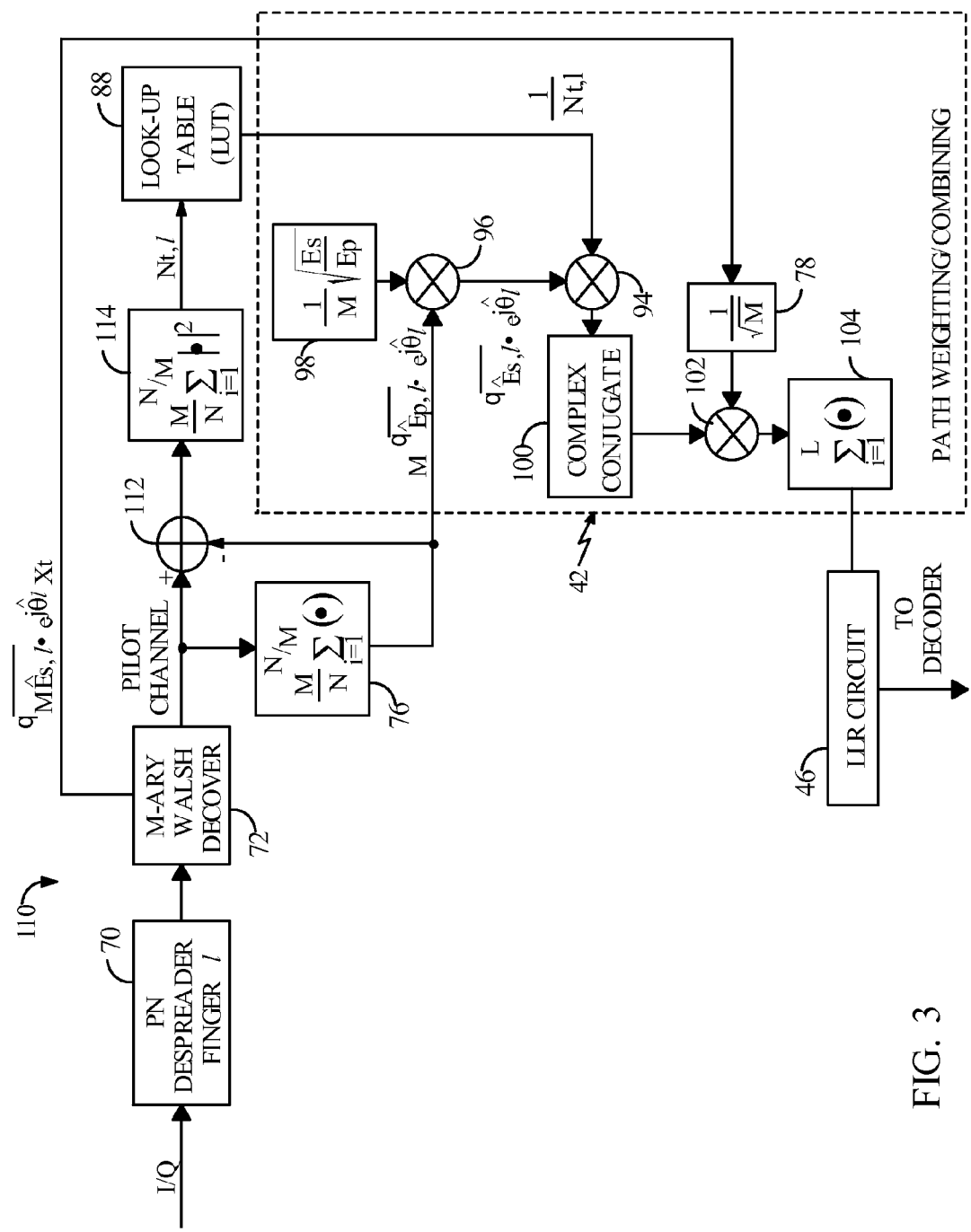
FIG. 3 is an accurate interference energy computation circuit optimized for reverse link transmission and including the path weighting and combining circuit and the LLR circuit of FIG. 2.

FIG. 3 is a diagram of an accurate interference energy computation circuit 110 optimized for reverse link transmission and including the path weighting and combining circuit 42 and the LLR circuit 46 of FIG. 2.

The operation of the interference energy computation circuit 110 is similar to the operation of the C/I and $N_t$ estimation circuit 12 of FIG. 2 with the exception of the calculation of $N_t$. The interference energy computation circuit 110 includes the PN despreader 70, the M-ary Walsh decover circuit 72, and the pilot filter 76. The M-ary Walsh decover circuit 72 decovers, i.e., extracts the pilot channel and the data channel from the despread I and Q signal samples output from the PN despreader 70.

In the interference energy computation circuit 110, the pilot channel is provided to a positive input of a pilot subtractor circuit 112 and to the pilot filter 76. The pilot filter 76 suppresses noise and interference components in the pilot channel and provides a filtered pilot signal to a negative input of the pilot subtraction circuit 112. The pilot subtractor circuit 112 subtracts the pilot channel from the filtered pilot channel and outputs a signal representative of the interference and noise per symbol introduced by the channel between the transmitting base station (not shown) and the transceiver system (see 10 of FIG. 1) in which the interference energy computation circuit 110 is employed. The energy ($N_{t,l}$) of the interference and noise signal for each symbol computed via an interference energy computation circuit 114 in accordance with the following equation:

$$N_{t,l} = \frac{M}{N} \sum_{i=1}^{N/M} |\bullet|^2, \tag{9}$$

where M is the number of chips per Walsh symbol, N is the number of chips (64 chips) in the pilot burst, and ● is the output of the pilot subtractor circuit 112.

The interference energy computation circuit 110 is employed when the constant value c provided by the first constant generation circuit 84 of FIG. 2 is not known. This is the case with many reverse link applications.

Figure 4:
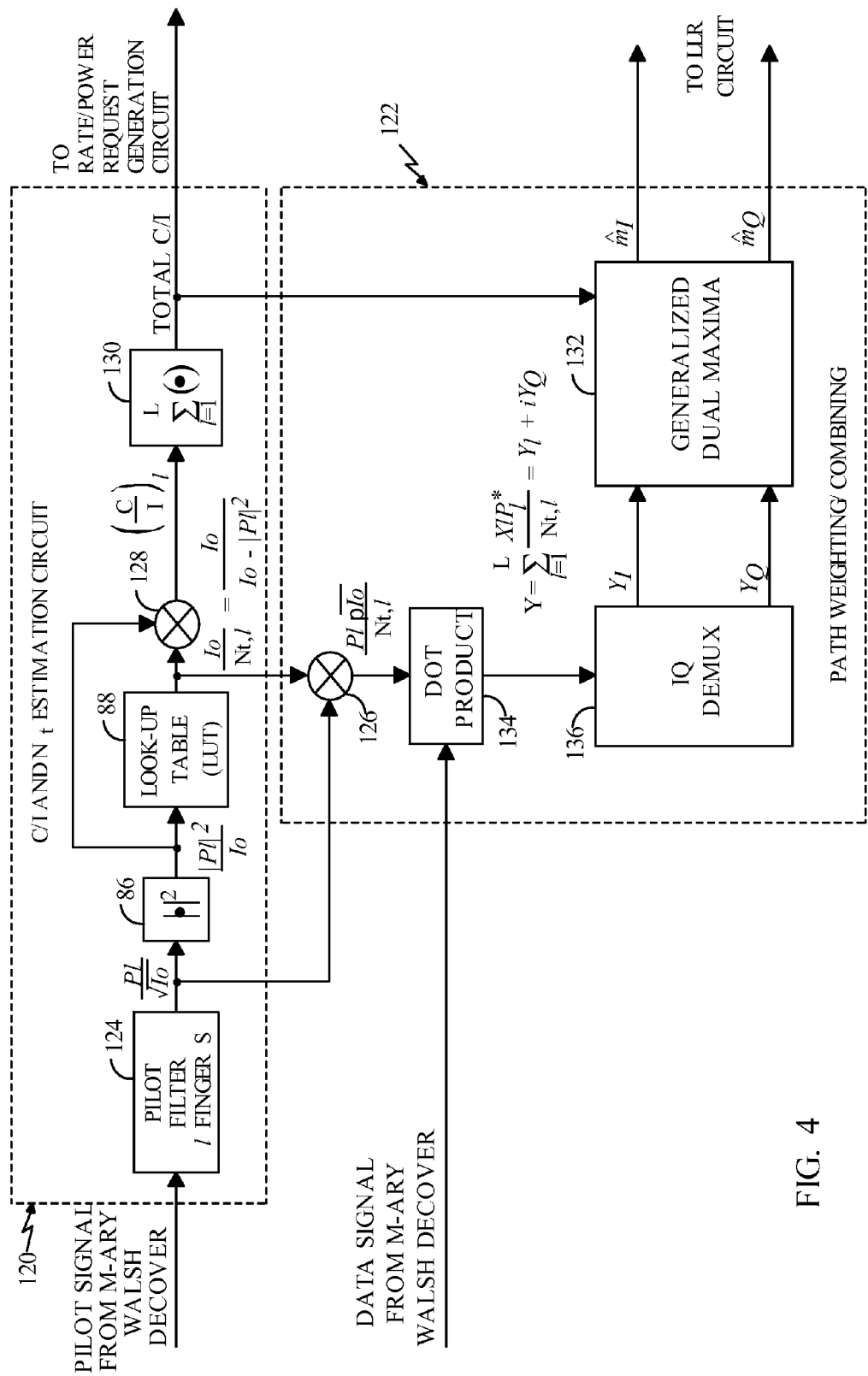
FIG. 4 illustrates alternative embodiments of the accurate interference energy estimation circuit and the maximal ratio path-combining circuit of FIG. 2.

FIG. 4 is a diagram showing alternative embodiments 120 and 122 of the accurate interference energy estimation circuit and the maximal ratio path-combining circuit of FIG. 2, respectively, and adapted for use with a forward link. The alternative C/I and $N_t$ estimation circuit 120 includes a pilot fingers filter 124 connected, in parallel, to pilot energy calculation circuit 86 and to an input of a pilot signal multiplier 126. The output of the pilot energy calculation circuit 86 is connected, in parallel, to the LUT 88 and to an input of a pilot energy signal multiplier 128.

An output of the LUT 88 is connected, in parallel, to another input of the pilot energy signal multiplier 128 and to another input of the pilot signal multiplier 126. The output of the pilot energy signal multiplier 128 is input to a C/I path accumulation circuit 130. An output of the C/I path accumulation circuit 130 is connected, in parallel, to an input of the rate/power generation circuit 44 of FIG. 1 and to an input of an generalized dual maxima circuit 132.

An output of the pilot signal multiplier 126 is connected to an input of a dot product circuit 134. Another input of the dot product circuit 134 is connected to an output of the M-ary Walsh decover circuit 72 of FIG. 3. An output of the dot product circuit 134 is connected to an input of an I and Q signal demultiplexer (DEMUX) 136. The I and Q DEMUX 136 provides a quadrature output ($Y_Q$) and an in-phase output ($Y_I$) of the I and Q signal DEMUX 136 are connected to an input of the generalized dual maxima circuit 138. An in-phase metric ($m_I$) and a quadrature metric ($m_Q$) of the generalized dual maxima circuit 132 are connected to the LLR circuit (see 46 of FIGS. 1, 2, and 3). The I and Q DEMUX 136 provides a quadrature output ($Y_Q$) and an in-phase output ($Y_I$) of the I and Q signal DEMUX 136 are connected to an input of the generalized dual maxima circuit 138.

In operation, the pilot fingers filter 124 receives a despread pilot signal from the output of the M-ary Walsh decover circuit 72 of FIG. 3 and outputs a filtered signal (p) in accordance with the following equation:

$$p = \frac{P_l}{\sqrt{I_0}}, \tag{10}$$

where $P_l$ is a pilot signal associated with the $l^{th}$ multipath component of the received pilot signal, and $I_o$ is the total received energy per chip as defined by the following equation:

$$I_0 = I_{or,l} + N_{t,l}, \tag{11}$$

where $N_{t,l}$ represents, as previously mentioned, the interference and noise component associated with the $l^{th}$ multipath component of the received signal, and $I_{or}$, represents the energy of the desired component of the received signal associated with the $l^{th}$ multipath component.

The filtered signal p is input to the pilot energy calculation circuit 86 where the magnitude of the signal p is squared and output to the LUT 88. The LUT 88 is adjusted to subtract the squared signal p2 from 1 and then invert the result to yield the following equation:

$$\frac{1}{1 - \frac{|P_l|^2}{I_0}} = \frac{I_0}{I_0 - |P_l|^2} = \frac{I_0}{N_{t,l}}, \tag{12}$$

where $P_l$ and $I_o$ are as given for equations (10) and (11). $N_{t,l}$, as mentioned previously, represents the energy associated with an interference and noise component of the received signal associated with the $l^{th}$ multipath component. $|P_l|^2$ provides an accurate estimate of $I_{or}$.

The resulting output of the LUT 88 is multiplied by the output of the pilot energy computation circuit 86 via the pilot energy signal multiplier 128 to yield an accurate C/I value for the $l^{th}$ multipath component of the signal received by the system 20 of FIG. 1. The C/I values are added over the L multipaths comprising the received signal via the C/I path accumulation circuit 130. The C/I path accumulation circuit 130 provides an accurate estimate of the total C/I to the rate/power request generation circuit 44 of FIG. 1 and to the dual maxima computation circuit 132.

The pilot signal multiplier 126 multiplies the output of the pilot fingers filter 124 with the output of the LUT 88 to yield the following output (y):

$$y = \frac{P_l\sqrt{I_0}}{N_{t,l}}, \quad (13)$$

where the variables are as given for equation (12).

The output of the pilot signal multiplier 126 as given in equation 13 is provided to the dot product circuit 134. The dot product circuit 134 also receives as input a data signal (d) from the M-ary Walsh decover circuit 72 of FIG. 2. In the present embodiment, the data signal d is represented by the following equation:

$$d = \frac{X_l}{\sqrt{I_0}}, \quad (14)$$

where $X_l$ is a quadrature amplitude modulation (QAM) signal associated with the $l^{th}$ multipath component of the signal received by the system 20 of FIG. 1, and $I_o$ is as given in equation (11).

The system of FIG. 4 implements a similar algorithm as the system of FIG. 2 with the exception that the system of FIG. 4 shows scaling due to automatic gain control circuitry (see FIG. 1) explicitly. The system of FIG. 4 also shows the LUT 88 used to convert $(I_{or,l})/(I_o)$ to $(I_{or,l})/(N_{t,l})$ and to the reciprocal of $(N_{t,l})/(I_o)$ without explicitly computing $I_o$ as in FIG. 2. $(I_{or,l})/(I_o)$ is approximately equal to $(|P_l|^2)/(I_o)$ as output from the pilot energy calculation circuit 86 of FIG. 4 and equals $E_p/I_o$ if $E_p/I_{or}=1$, where $E_p$ is the pilot symbol energy as described above.

The dot product circuit 134 takes the dot produce of the signal d with the signal y, which are defined in equations (14) and (13), respectively, and provides an output signal (Y) in accordance with the following equation:

$$Y = \sum_{l=1}^{L} \frac{X_l P_l^*}{N_{t,l}} = Y_I + iY_Q, \quad (15)$$

where L is the total number of multipaths; I is a counter and represents a particular I path of the L multipaths; $Y_I$ represents an in-phase component of the received data signal, and $Y_Q$ represents an imaginary quadrature component of the received data signal. The other variables, i.e., $X_l$, $P_l$, and $N_{t,l}$ are as given for equations (13 and (14).

The DEMUX 136 selectively switches I ($Y_I$) and Q ($Y_Q$) components of the output Y defined by equation (15) onto separate paths that are provided to the generalized dual maxima circuit 132 that outputs metrics $\hat{m}_I$ and $\hat{m}_Q$ respectively, in response thereto to the LLR circuit 46 of FIG. 1.

Figure 5:
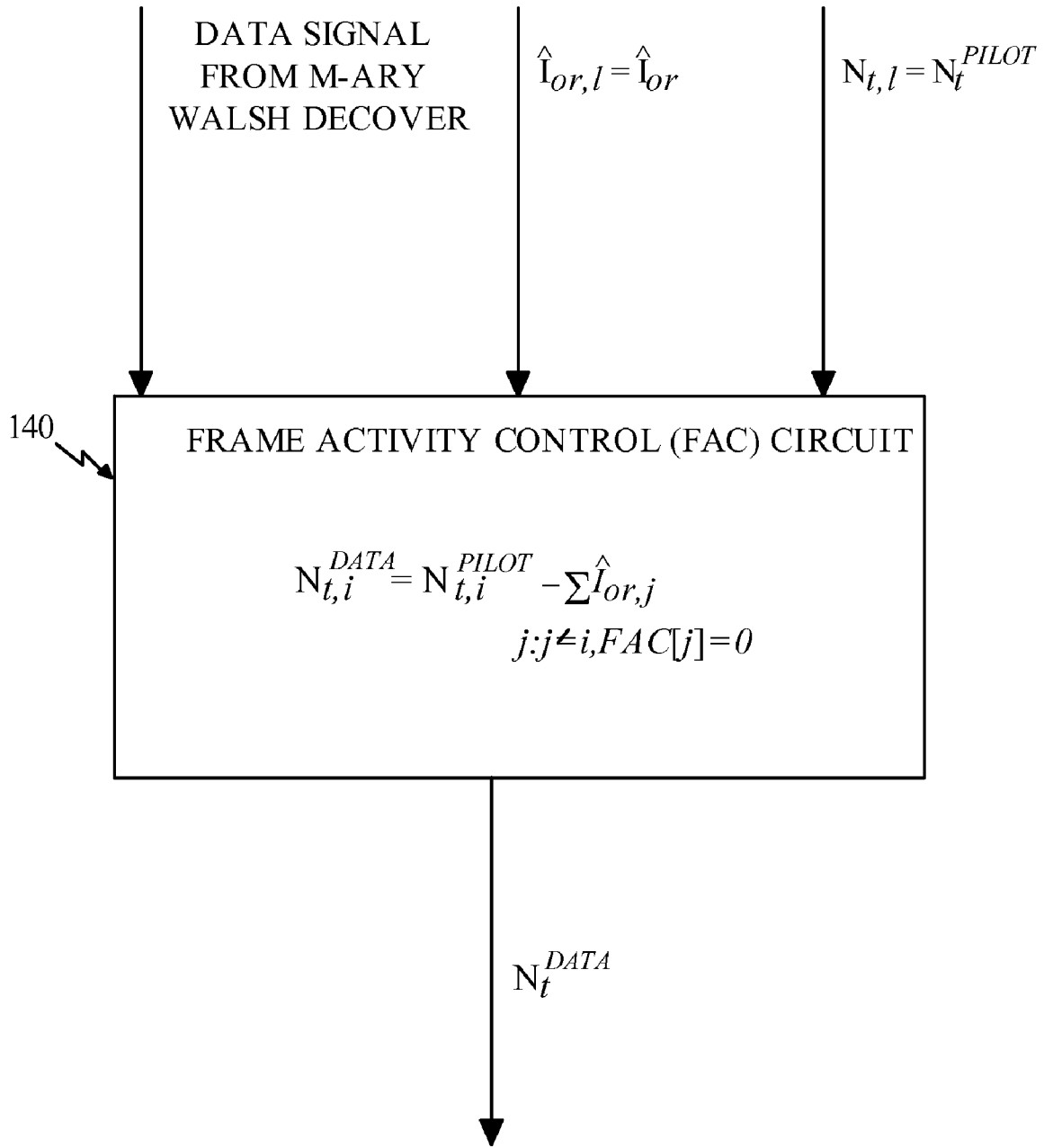
FIG. 5 is a block diagram of a frame activity control circuit for improving estimates of interference energy and adapted for use with the accurate interference energy computation circuit of FIG. 2.

FIG. 5 is a block diagram of a Frame Activity Control, FAC, circuit 140 for improving estimates of interference energy ($N_t$) and adapted for use with the accurate C/I and $N_t$ estimation circuit 12 of FIG. 2.

With reference to FIGS. 2 and 5, the FAC circuit 140 can be inserted in the C/I and $N_t$ estimation circuit 12 of FIG. 2 at the input of the LUT 88. The FAC circuit 140 receives $N_{t,l}$ from the output of the subtractor circuit 80 and the data channel output from the M-ary Walsh Decover 72, and the output of the first multiplier 82 and outputs a new estimate of $N_{t,l}$, i.e., $N_t^{Data}$, which is an interference (including noise) estimate revised for the fact that some base stations broadcast during the pilot interval and do not broadcast during the data interval. Base stations that broadcast during the pilot interval contribute to the noise and interference associated with the channel and measured via the pilot signal. If some base stations do not broadcast during the data interval but broadcast during the pilot interval, the estimate of the channel noise and interference based on the pilot interval will be too large, i.e., $N_{t,data} < N_{t,pilot}$ and $(C/I)_{data} < (C/I)_{pilot}$.

Waveforms broadcast by base stations include a FAC bit. The FAC bit indicates to a mobile station, such as the system 10 of FIG. 1 whether or not the traffic channel of the associated pilot signal will be transmitting during the half frame following the next half frame. If the FAC bit is set to a logical 1 for example, the forward traffic channel may be inactive. If the FAC bit is clear, i.e., corresponds to a logical 0, the corresponding forward channel is inactive. The FAC bit transmitted during half-frame n for the $i^{th}$ base station, i.e., $FAC_i(n)$ specifies the forward data channel activity for the next frame, i.e., half frame (n+2).

Use of the FAC bit improves C/I estimates in communications systems where some base stations broadcast during the pilot interval and not during the data interval. As a result, use of the FAC bit results in superior data rate control as implemented via the rate/power request generation circuit 44 of FIG. 1. Use of the FAC bit also helps to ensure that forward data channel transmissions of up to 8 slots beginning with half-frame n+1 and based on data rate control messages accounting for base station inactivity via the FAC bits are valid.

The FAC circuit 140 subtracts the interference contributions from the base stations that will not be broadcasting during the data interval in accordance with the following equation.

$$N_{t,i}^{Data} = N_{t,i}^{Pilot} - \sum_{j: j \neq i, FAC[j]=0} \hat{I}_{or,j}, \quad (16)$$

where i is the index of the base station, i.e., sector for which $N_{t,i}^{Data}$ is being estimated. j is a counter that is incremented for each base station counted. $N_{t,i}^{Data}$ represents the interference energy for the $l^{th}$ multipath component and associated with the data transmission for the $j^{th}$ base station. Similarly, $N_{t,i}^{Pilo}$ represents the interference energy for the $l^{th}$ multipath component and associated with the pilot transmission for the $j^{th}$ base station. $\hat{I}_{or,j}$ is the energy of the desired signal component received from the $j^{th}$ base station.

With access to the present teachings, those ordinarily skilled in the art can easily construct the FAC circuit 140 without undue experimentation.

During the pilot interval and while the interference energy $N_t$ is being estimated, all base stations in communication with the transceiver system 10 of FIG. 1 are transmitting at full power. If a certain base station is idle during the data intervals preceding and following a pilot interval, then in the presence of a large multipath spread, the interference from the base station may not be received during the entire duration of the pilot signal from another base station. To avoid a resulting inaccuracy in the estimation of $N_t$, the base station transmits an idle skirt signal before and after pilot bursts and during idle data intervals. The length of the idle skirt signal is longer than the anticipated multipath spread associated with the channel.

In a preferred embodiment, the length of the idle skirt signal is configurable from a minimum length of zero to a maximum length of 128 chips.

Figure 6:
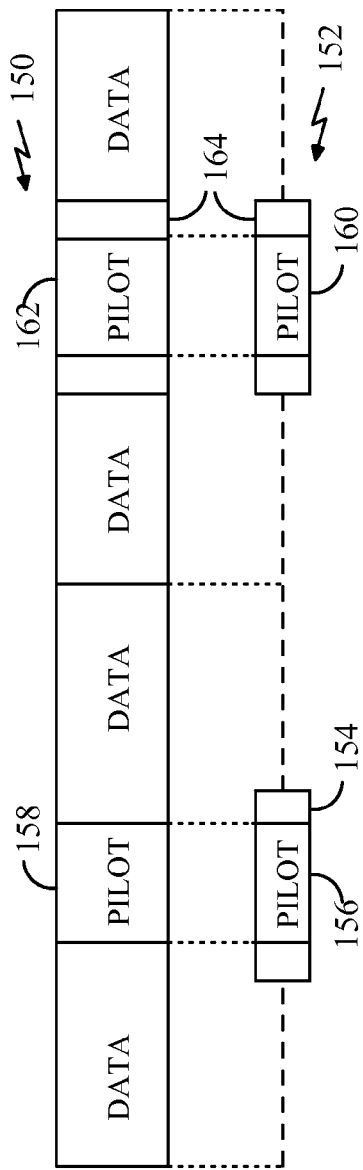
FIG. 6 is an exemplary timing diagram showing an active slot and idle slot.

FIG. 6 is an exemplary timing diagram showing an active slot 150 and an idle slot 152. Pilot skirts 154 are shown before and after a first pilot burst 156 and during idle slot 152. The first pilot burst 156 corresponds to a second pilot burst 158 during the active slot 150.

FAC signals 164, i.e., reverse power control channel (RPC) signals are also shown before and after a third pilot burst 160 in the idle slot 152 and a corresponding fourth pilot burst 162 in the active slot 150.

Figure 7:
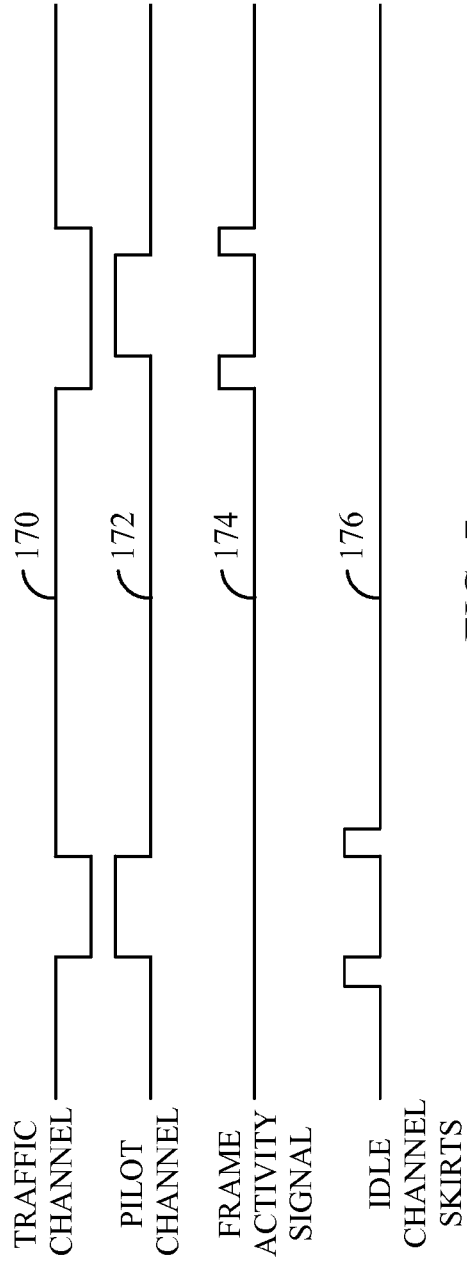
FIG. 7 is an exemplary timing diagram showing a traffic channel signal, a pilot channel signal, a Frame Activity Control, FAC, signal (also known as a reverse power control channel), and idle channel skirts of the slots of FIG. 6.

FIG. 7 is an exemplary timing diagram showing a traffic channel signal 170, a pilot channel signal 172, a FAC signal 178, and idle channel skirt signal 180 of the slots of FIG. 6.

II. Spatial Minimization of Mean Square Error

In CDMA wireless communication systems, such as HDR systems, it is desirable to implement a rake receiver to achieve time-diversity, wherein the rake receiver combines the energy from time-varying multipath propagations, as described hereinabove. It is also desirable to implement receiver diversity via multiple receiver antennas to achieve space-diversity to overcome multipath fades in the received signal energy at each antenna. Additionally, a suitable choice of combiner weights for the rake receiver and configuration of multiple antenna receivers allows for interference suppression in the spatial domain.

Figure 8:
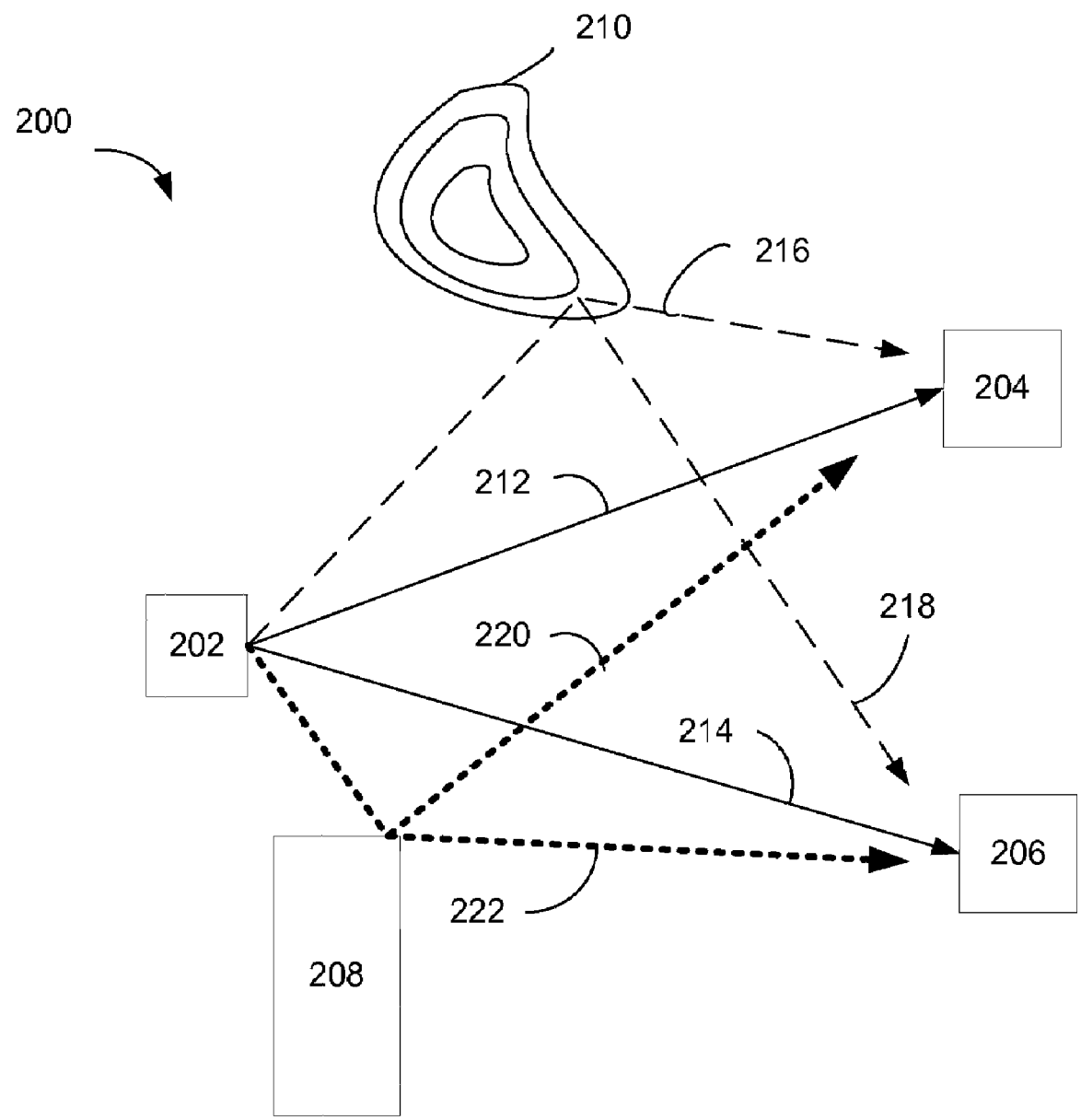
FIG. 8 is a wireless communication system.

FIG. 8 illustrates a wireless communication system capable of HDR communications, employing a technique to compute the combiner coefficients for wireless communication systems for a space-time solution (i.e., each path or rake finger of each receiver antenna) The system is incorporated into a CDMA waveform with a time gated pilot signal transmitted at full power. The pilot signal is used to determine the weights, or train the receiver, and the weights are then applied to processing traffic and other signals received and processed by the rake receiver.

FIG. 8 illustrates a wireless communication system 200 having a Base Station, BS 202, and multiple Mobile Stations, MSs 204, 206. Information symbols are transmitted from BS 202 to MSs 204, 206 as transmission signals. Symbols, y[n], carry the information and may be considered the alphabet of the communication. Symbols may be pilot symbols or data symbols. For example, in a system using a 16 Quadrature Amplitude Modulation, QAM, type modulation scheme, the symbols are each based on 4 bits of information. In a system using Quadrature Phase Shift Keying, QPSK, type modulation, the symbols are each based on 2 bits of information. The symbols are transmitted through the communication channel as signals, x(t), or continuous time waveforms. The signals received at a receiver includes all contributions including noise and interference added by the communication channel as well as transmit and receive processing. The received signal is sampled at the receiver, wherein samples are taken at a sampling rate with sampling period Ts. Samples, x(nTs), represent the signal value at periodic instances of time. The receiver has a prior knowledge of the pilot symbol, however, the receiver does not have a priori knowledge of the data symbols. Based on the received samples, the receiver generates a symbol estimate, ŷ.

The receiver uses the pilot symbol to determine the data symbol estimate. In the exemplary embodiment, an HDR system has a time-gated pilot, wherein the pilot is transmitted at full power. FIG. 14 illustrates one embodiment, wherein data and pilot transmissions are mutually exclusive, thus allowing the pilot symbol to be used to train the receiver in preparation for estimating the received data symbol. The receiver uses the a priori knowledge of the pilot symbol to determine a signature of the transmission channel. As the pilot occurs at a time known a priori to the receiver, and the pilot is transmitted at an energy level known a priori to the receiver, the pilot provides valuable information for training. The signature associated with the channel tracks the changes to a transmitted signal for a given path. The signature considers the transmission channel and the receiver processing effects. Throughout this discussion, the signature is given as a vector $\underline{c}$, made up of the individual $\underline{c}_i$ associated with each path.

As illustrated in FIG. 8, BS 202 transmits pilot and data symbols to MSs 204, 206. According to the particular implementation, the BS 202 may transmit a variety of information including, but not limited to, paging symbols, sync symbols, other traffic symbols, etc. The BS 202 transmits the symbols as signals, wherein a given signal transmission from BS 202 creates multiple transmission paths. A first direct path 212 is generated from BS 202 to MS 204, and a second direct path 212 is generated from BS 202 to MS 206. The transmission signal from BS 202 creates multipaths as echoes bounce off of structures in the environment. Multipaths 216, 218 are created as the transmission signal experiences geographical structure 210. Multipaths 220, 222 are created as the transmission signal experiences a building structure 208, wherein echoes bounce off structure 208. Each of MSs 204, 206 receives the multipaths thus created and must distinguish among the various received signals. Note that geographical structure 210 and building structure 208 may be any structure or construct within the wireless system environment. With respect to MS 204, path 212 is referred to as PATH 1, path 216 is referred to as PATH 2, and path 220 is referred to as PATH 3. Similarly, with respect to MS 206, path 214 is referred to as PATH 1, path 218 is referred to as PATH 2, and path 222 is referred to as PATH 3.

Figure 9:
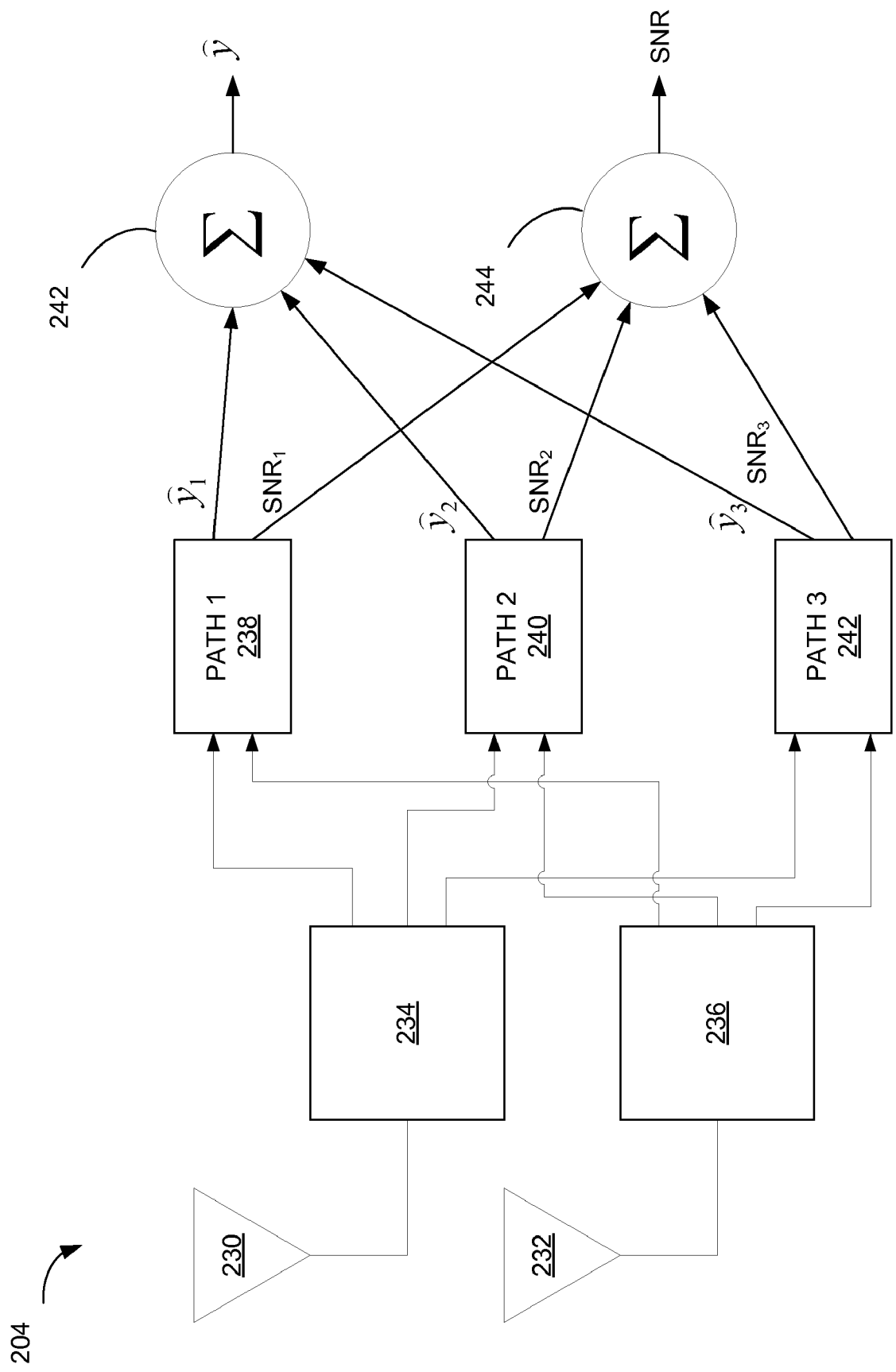
FIG. 9 is a receiver in a wireless communication system.

Consider a communications system in which a stream of data symbols y[n] are transmitted through a communications channel to a receiver. In FIG. 9 MS 204 has multiple antennas. A pre-processor (not shown) at each antenna would typically comprise: radio-receiver; Radio Frequency, RF, to baseband conversion; receiver lowpass filtering; Automatic Gain Control, AGC; and ADC. The inphase (J) and quadrature (Q) samples of the complex signal at the preprocessor output are input to the baseband processor. In contrast to an MRC calculation, an example of which is described hereinabove, wherein symbol estimates are determined for each path-antenna combination, MS 204 determines symbol estimates using a Minimization of Mean Square Error, MMSE, approach. The MMSE method generates path-specific combiner weights, wherein the (AL×AL) matrix that defines the system is reduced to L (A×A) matrices as illustrated in FIG. 12B described hereinbelow. Again L is the number of paths, as illustrated in FIG. 8, and A is the number of receive antennas. The exemplary embodiment considers a scenario of three paths and two receive antennas, however alternate embodiments may be of any configuration, including: Single Input Single Output, SISO, wherein a given communication link has one transmit antenna and one receive antenna; Single Input Multiple Output, SIMO, wherein a given communication link has one transmit antenna and multiple receive antennas; Multiple Input Single Output, MISO, wherein a given communication link has more than one transmit antenna and one receive antenna; Multiple Input Multiple Output, wherein a given communication link has more than one transmit antenna and more than one receive antenna.

The MMSE method allows MS 204 to generate symbol estimates for each path by considering the signal as received at multiple antennas. MS 204 has two antennas 230, 232, each coupled to RAKE receivers 234, 236, respectively. Each RAKE receiver has 3 fingers for identifying various transmission paths. Each of the three fingers corresponds to one of the paths. For example, in RAKE receivers 234 and 236, the fingers track paths 212, 216, 220, i.e., PATH 1, PATH 2, PATH 3. Note that paths 212, 216, 220 are the versions of PATH 1, PATH 2, PATH 3, received respectively at rake receiver 234. Note that alternate embodiments may include any number of antennas and receivers.

Continuing with FIG. 9, within MS 204, the PATH 1 signals from both rake receiver 234 and rake receiver 236 are processed by unit 238, PATH 2 signals by unit 240 and PATH 3 by unit 242. In this way, MS 204 analyzes each path for determination of the combiner weights and other parameters. Note that in alternate embodiments, other parameters may be used to generate the combiner weights, and similarly, the combiner weights may be used to generate still other parameters as used in MS 204 and system 200.

Continuing with FIG. 8, units 238, 240, 242 generate symbol estimates, $\hat{y}_i$, and SNR values for each of PATH 1, PATH 2, PATH 3, respectively. Unit 238 generates $\hat{y}_1$ and $SNR_1$; unit 240 generates $\hat{y}_2$ and $SNR_2$; unit 242 generates $\hat{y}_3$ and $SNR_3$. The symbol estimates are combined at summation node 242 and output as a composite estimate $\hat{y}$. The SNR values are combined at summation node 244 and output as a composite SNR. These values are then available for further processing within MS 204. In one embodiment, the MS 204 provides the SNR and/or the composite estimate $\hat{y}$ to the BS 202 for further processing, such as statistical analysis of the channel environment.

Figure 10:
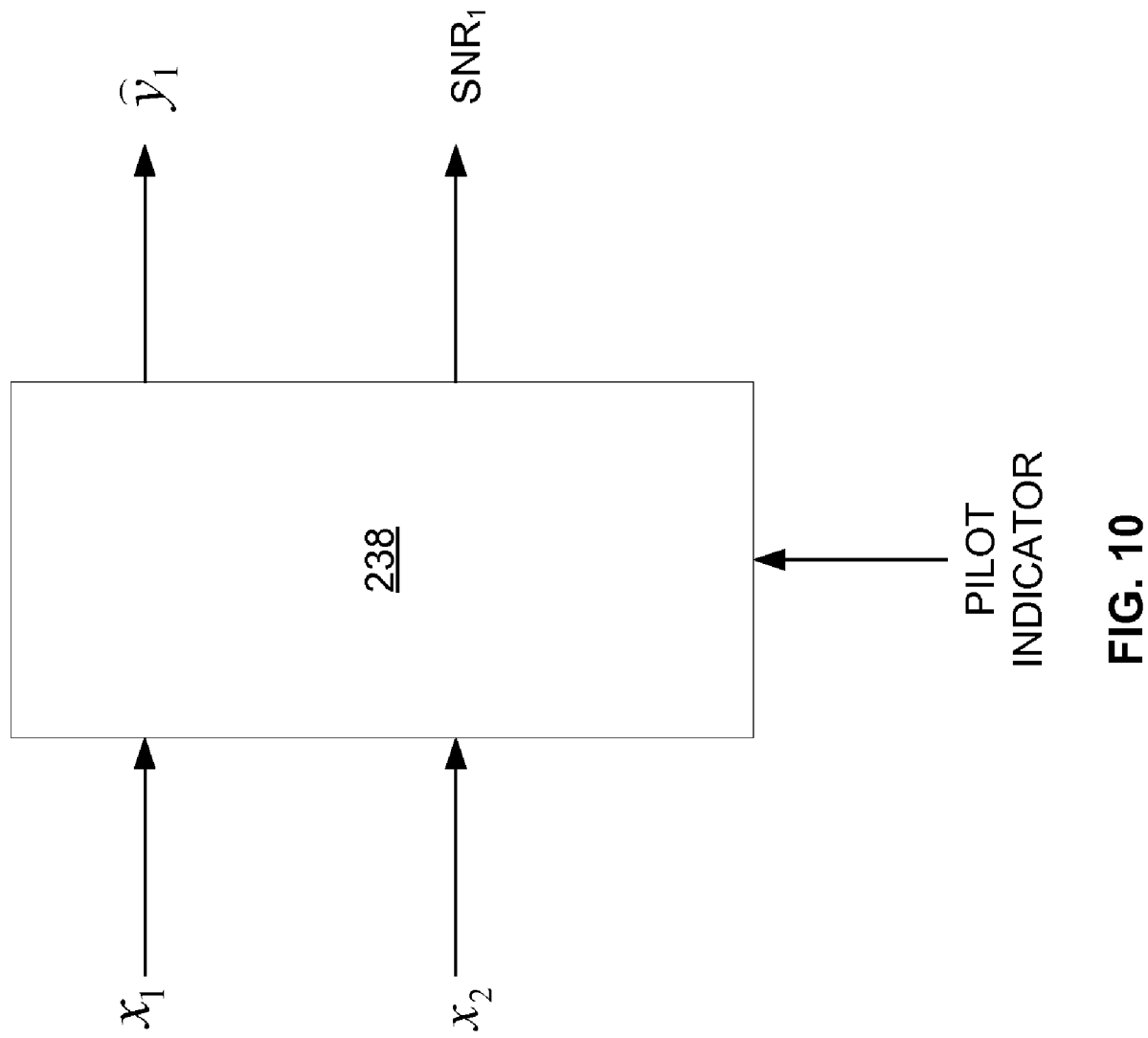
FIG. 10 is a processing unit for one path of a wireless communication system.
Figure 11:
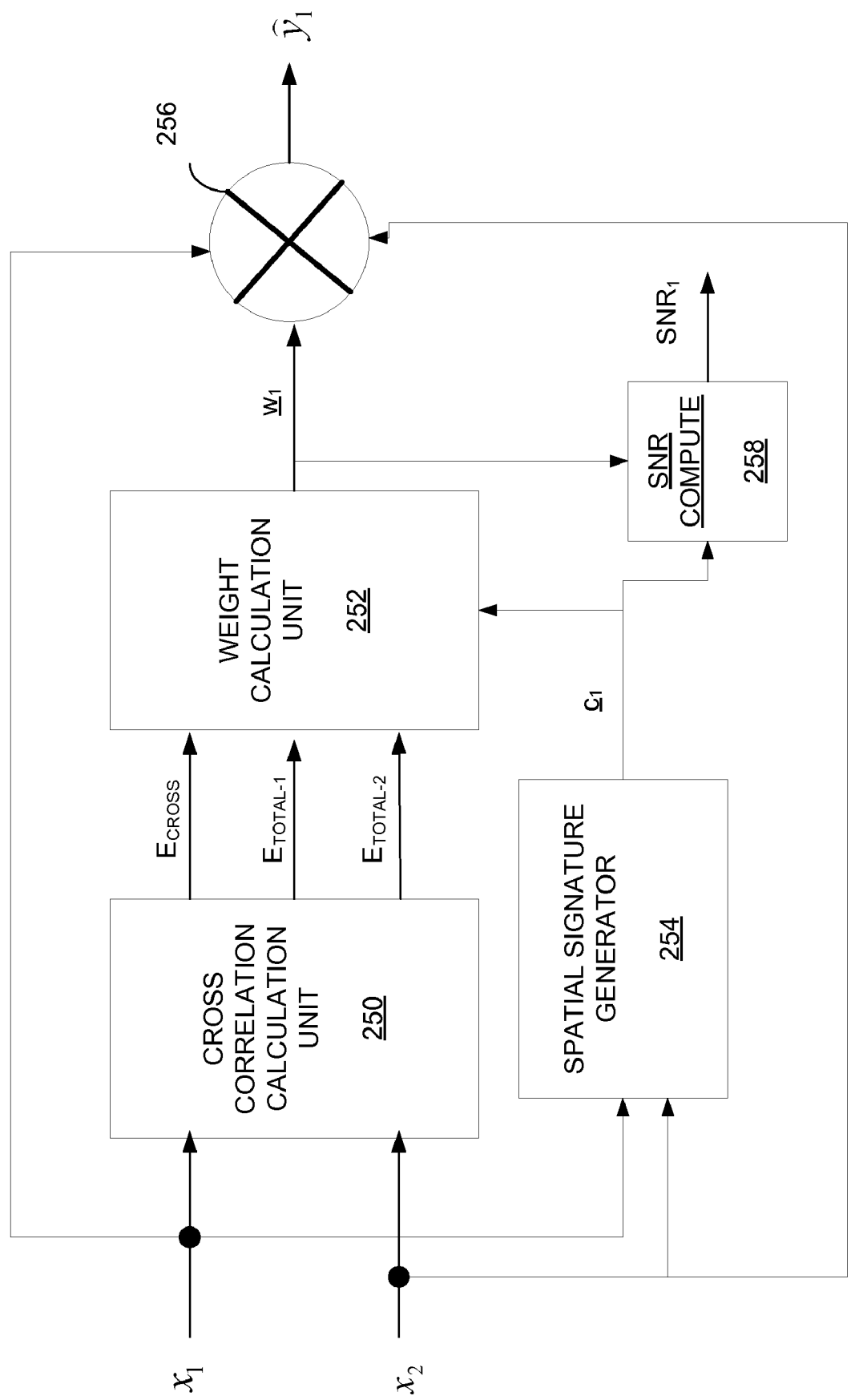
FIG. 11 is a detailed diagram of the processing unit for one path of a wireless communication system.

FIG. 10 illustrates unit 238 of FIG. 9, wherein a pilot signal indicator provides control of the unit 238. The stream of data samples $x_1$ is provided to unit 238 by one finger of rake receiver 234, and the stream of data samples $x_2$ is provided to unit 238 by one finger of rake receiver 236. The data samples $x_1$ and $x_2$ are associated with PATH 1. The units 240, 242 are configured in a similar manner. Each rake receiver 234, 236 has three fingers, each finger corresponding to a path. The sample processed by each finger is provided to one of units 238, 240, 242. FIG. 11 provides a detailed description of the unit 238.

Unit 238 includes cross correlation calculation unit 250, weight calculation unit 252, spatial signature generator 254, and SNR computation unit 258. The data samples $x_1$ and $x_2$ are provided to units 250, 254. The cross correlation calculation unit 250 generates the values for used in determining a received signal autocorrelation matrix based on the received data samples $x_1$ and $x_2$. The unit 250 generates the cross correlation $E_{CROSS}$ between all antennas of MS 204, specifically in the present embodiment, antennas 230, 232. Further, unit 250 generates an expectation value for each path, $E_{TOTAL\text{-}1}$, $E_{TOTAL\text{-}2}$, respectively.

Continuing with FIG. 11, the values $E_{CROSS}$, $E_{TOTAL\text{-}1}$, and $E_{TOTAL\text{-}2}$ are provided to weight calculation unit 252. The unit 252 forms the autocorrelation matrix $R_{xx}$ as given in FIG. 12. FIG. 12 provides equations used in one embodiment for generating the autocorrelation matrix. The noise correlation $R_{nn}$ is then determined as a function of the autocorrelation matrix R, and the signature. The calculation of $R_{nn}$ according to one embodiment is illustrated in FIG. 12. Additionally, the unit 252 generates a weight $\underline{w}_l$ to be applied to PATH 1. The weight calculation uses the noise correlation and the spatial signature $C_1$. The spatial signature $\underline{c}_1$ is generated by spatial signature generator 254, which provides the signature vector $\underline{c}_1$ to weight calculation unit 252 and SNR computation unit 258 which generates $SNR_1$ associated with PATH 1. The weight calculation unit provides the weight vector $\underline{w}_l$ to SNR computation unit 258.

The unit 252 provides the weight $\underline{w}_l$ to the multiplier 256 for application to data samples received on PATH 1. The data samples $x_1$, from antenna 230, and the data samples $x_2$ from antenna 232 are then provided to multiplier 256 for application of the calculated weight $\underline{w}_l$. The multiplier 256 outputs an estimated value for PATH 1 labeled $\hat{y}_1$ Operation of units 240 and 242 are similar to that of unit 238 with respect to PATH 2, and PATH 3, respectively.

Figure 13:
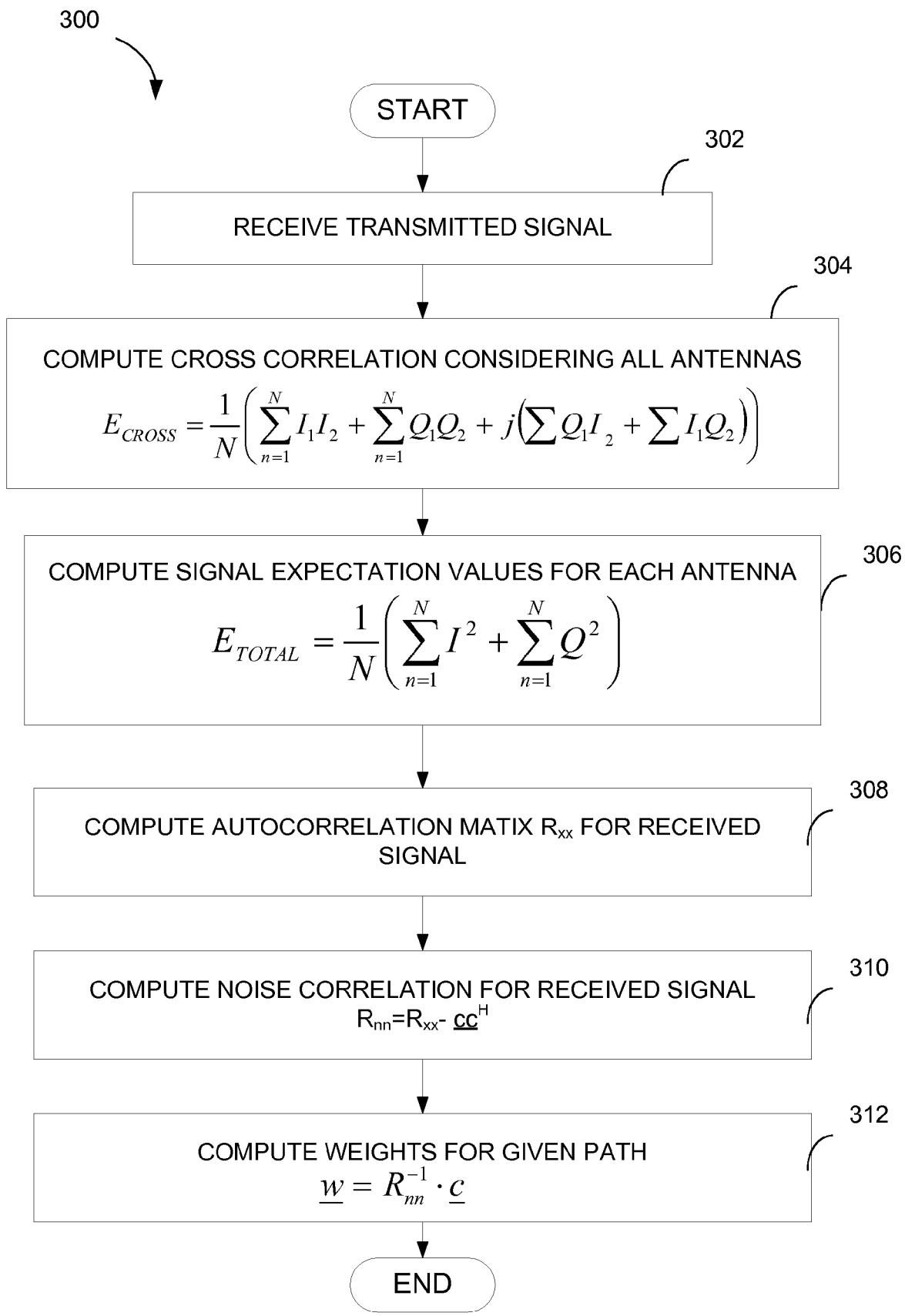
FIG. 13 is a flow diagram of one method of determining combiner weights for use with a rake receiver.

The method of calculating the combiner weights on a per path basis may be performed in hardware, software, and/or firmware. The operation of each module within units 238, 240, 242 may be implemented by a digital signal processor, or other processing unit. A method 300 for calculating combiner weights in a wireless communication system having is illustrated in FIG. 13. The MS receives a transmitted signal at step 302. The received signal is converted to the digital domain to form data samples. From the data samples, the MS computes a cross correlation considering all receive antennas.

Continuing with FIG. 13, the cross correlation of multiple antennas for a common path is given as in FIG. 12. At step 306, the receiver computes signal expectation values for each antenna, $E_{TOTAL}$, as given in FIG. 12. Having calculated all the elements of the autocorrelation matrix, the receiver then builds the autocorrelation matrix $R_{xx}$ for the received signal of a given path. The autocorrelation matrix is given in FIG. 12. At step 310 the receiver computes the noise correlation matrix of the received signal. The noise correlation matrix is equal to the autocorrelation matrix minus a signature matrix, wherein the signature matrix is formed by multiplying the spatial signature by its Hermitian value. Finally, the receiver computes the weights for the given path.

Basically, the method 200 computes the correlations to estimate a noise autocorrelation matrix and the desired signature. This MMSE approach computes MMSE per path combiner weights by matrix inversion. The computed weights are then used to combine signal paths from rake receiver fingers for all receive antennas of the receiver. Further, a SNR estimate is calculated based on the desired signal signature and the MMSE weights. The SNR estimate may be used for rate and/or power control. The LLRs may be calculated based on the SNR estimate and the MMSE combined signal path, wherein the LLRs are fed to the channel decoder circuitry (not shown).

In a CDMA system with PN spreading and Walsh covering, it is often reasonable to assume that the interference associated with different paths are uncorrelated on all antennas, but that interference associated with the same path are correlated across different antennas. With this assumption, it is possible to disjointly compute the A combiner weights for each of the L paths, and thus invert L different A×A matrices, as illustrated in FIG. 12B. Such computation is for the spatial MMSE weights for each of the L paths, i.e., spatial MMSE for uncorrelated interference on different paths. One embodiment of the resultant autocorrelation matrix is illustrated in FIG. 12B, wherein each path has a smaller matrix on the diagonal of the autocorrelation matrix. While still more complex than that of the MRC method, these smaller matrices are easier to manipulate and invert than a full matrix, thus reducing the problem to L (A×A) matrix inversions.

Referring again to FIG. 9, for a receiver with two antennas and L RAKE fingers per antenna, assume the interference associated with different paths is uncorrelated. For the lth path, compute the 2×1 complex combining vector $\underline{W}_l$ by calculating:

$$\underline{w}_l = \begin{bmatrix} w_{1,l} \\ w_{2,l} \end{bmatrix} = R_{nn,l}^{-1} \underline{c}_l. \quad (17)$$

When the CDMA system includes PN spreading and Walsh covering, the baseband processor first PN despreads and then Walsh decovers the appropriately interpolated and/or aligned baseband samples for the ath antenna and $l^{th}$ path, yielding the chip-rate samples $Z_{a,l}[n]$ The spatial signature is computed from pilot filtering the received samples corresponding to the N-chip pilot interval:

$$\underline{c}_l = \begin{bmatrix} c_{1,l} \\ c_{2,l} \end{bmatrix} = \begin{bmatrix} \frac{1}{N}\sum_{n=k}^{k+N-1} z_{1,l}[n] \\ \frac{1}{N}\sum_{n=k}^{k+N-1} z_{2,l}[n] \end{bmatrix}. \quad (18)$$

The received signal autocorrelation matrix is computed from the N-chip pilot interval as:

$$R_{yy,l} = \begin{bmatrix} E_{Total}^{1,l} & E_{Cross}^{l} \\ (E_{Cross}^{l})^* & E_{Total}^{2,l} \end{bmatrix} = \quad (19)$$

$$\begin{bmatrix} \frac{1}{N}\sum_{n=k}^{k+N-1} z_{1,l}[n]z_{1,l}^*[n] & \frac{1}{N}\sum_{n=k}^{k+N-1} z_{1,l}[n]z_{2,l}^*[n] \\ \frac{1}{N}\sum_{n=k}^{k+N-1} z_{2,l}[n]z_{1,l}^*[n] & \frac{1}{N}\sum_{n=k}^{k+N-1} z_{2,l}[n]z_{2,l}^*[n] \end{bmatrix}$$

The noise autocorrelation matrix is then computed by subtracting the outer product of the spatial signature from the received signal autocorrelation matrix:

$$R_{nn,l} = R_{yy,l} - \underline{c}_l(\underline{c}_l)^H. \quad (20)$$

Although the $R_{nn,l}$ was inverted to compute the combiner weights, it is also possible to average or filter the $R_{nn,l}$ from successive pilot bursts and then invert the resulting averaged or filtered matrix. To invert the 2×2 $R_{nn,l}$ and calculate the MMSE combiner weights for the lth path, and make use of the simple result that:

$$\begin{bmatrix} a & b \\ b^* & c \end{bmatrix}^{-1} = \frac{1}{a \cdot c - |b|^2} \begin{bmatrix} c & -b \\ -b^* & a \end{bmatrix}, \quad (21)$$

and thus efficiently compute the matrix inverse.

It is possible to calculate the SNR for the lth path as:

$$SNR_l = \underline{w}_l^H \underline{c}_l. \quad (22)$$

With the assumption of uncorrelated noise between paths, the total SNR is then given by the sum:

$$SNR = \sum_{l=1}^{L} SNR_l. \quad (23)$$

The MMSE combined signal path is given by:

$$\hat{y}[n] = \sum_{l=1}^{L}\sum_{a=1}^{A} (w_{a,l}[m])^* z_{a,l}[m]. \quad (24)$$

The LLRs fed to the channel decoder are based on the SNR computed in equation (15) and the combined signal path computed in equation (24).

Consider an alternate embodiment wherein the received chip-rate samples are given as:

$$\begin{bmatrix} x_1[n] \\ x_2[n] \end{bmatrix} = \sum_{l=1}^{L} \begin{bmatrix} s_{1,l} \\ s_{2,l} \end{bmatrix} u_l[n] + \sigma_N \begin{bmatrix} w_1[n] \\ w_2[n] \end{bmatrix}, \quad (25)$$

wherein $$\begin{bmatrix} w_1[n] \\ w_2[n] \end{bmatrix}$$

represents 2-dimensional white noise with zero mean and unit variance and $u_l[n]$ represents the PN spread data signal being tracked by the lth RAKE finger. This model arises where all interfering paths and other base station signals are being tracked by the L RAKE fingers. Assuming that the PN spread data is zero mean on all paths $E\{u_l[n]\}=0$ and uncorrelated $E\{u_l[n]u_p[m]\}=\Box_{l,p}\Box_{m,n}$ then the received signal autocorrelation matrix is the same for all paths, namely:

$$R_{yy,l} = \sum_{p=1}^{L} \begin{bmatrix} s_{1,p} \\ s_{2,p} \end{bmatrix} \begin{bmatrix} s_{1,p} \\ s_{2,p} \end{bmatrix}^H + \sigma_N^2 \begin{bmatrix} 1 & 0 \\ 0 & 1 \end{bmatrix}. \quad (26)$$

The noise autocorrelation matrix $R_{nn,l}$ will generally be different for each path because that path's contribution is subtracted as per equation (20). In this embodiment, it is possible to calculate the spatial MMSE coefficients for each path by estimating $\sigma_N^2$ and calculating the spatial signatures $$\begin{bmatrix} s_{1,l} \\ s_{2,l} \end{bmatrix}$$

for all fingers. Note that if the process is tracking all desired and interfering multipaths, it is not necessary to estimate the off-diagonal terms in equation (19).

Each of the above detailed methods of estimating a received signal utilizes a variety of assumptions. The MRC approach considers all noise as independent. Such an assumption may be particularly applicable in a voice communication system, wherein the ratio of the signal to pilot is high. In a CDMA or spread spectrum type system, it is reasonable to assume that the other users may be treated as noise. In a data communication system, however, this assumption is not always accurate. Therefore, a MMSE approach may prove more accurate and efficient in an HDR environment. In contrast to the MRC method, the MMSE approach is performed per channel and considers all of the energy received on each receive antenna. The MMSE approach uses the full power pilot to train the adaptive filters and then applies the resultant values to the received data. The MMSE approach improves the C/I estimate and therefore allows for more accurate and efficient Data Rate Control, DRC, decisions. The MMSE also improves the weights and the resultant signal estimates. Like the MRC approach, the MMSE approach assumes noise to be independent.

III. MMSE Approach to a CDMA Type Pilot

It is desirable to apply the spatial MMSE approach for determining combiner weights to a system wherein the pilot is transmitted concurrently with other signals, such as traffic signals. In a cdma2000 type system, the pilot signal is transmitted continuously and shares the power of the transmitter with the traffic information. In such a system, wherein the pilot signal is not time-gated, i.e., is not Time Division Multiplexed, extraction of the pilot energy is not straightforward. One example is a CDMA type system, having a pilot signal, or other signal known a priori by the transmitter and receiver, that is not time gated, i.e., time multiplexed with other signals.

An alternate embodiment applicable in such spread spectrum systems may be implemented by considering an analog of equation (23) above, namely, replacing:

$$R_{nn} = R_{xx} - \underline{s} \cdot \underline{s}^H \quad (27)$$

with:

$$\mathrm{cov}(\underline{x}_{k,l}) = \frac{1}{N} \sum_{m=0}^{N-1} \underline{x}_k[m] \cdot \underline{x}_k[m]^H - \left( \frac{\sum_j |d_{k,j}|^2}{|d_{k,0}|^2} \right) \cdot \underline{s}_k \cdot \underline{s}_k^H \quad (28)$$

wherein $\underline{s}$ is the spatial signature. The covariance term is analogous to the autocorrelation of the noise, $R_{nn}$, the first term on the right side of the equation is analogous to the autocorrelation of the signals, $R_{xx}$. The second term on the right side of the equation includes a first term representing the relative energy of the pilot signal to the energy of other channels, and a second term representing a correction term. As given in equation (28) x is the sample value, m is a time index, d is a data symbol, and N is the length of the Walsh code. The covariance of equation (28) is based on the correlation of the signals prior to despreading. The despread signal is given as:

$$\underline{x}_{k,l} = \sum_{n=0}^{N-1} \underline{x}_k[n] \cdot w_{k,l}^*[n] \cdot p_k^*[n]. \quad (29)$$

The spatial signature is computed by despreading and decovering the pilot channel, i.e., for a CDMA system by filtering the pilot signal or other known signal, and is given as:

$$\underline{s}_k = \frac{1}{N} \sum_{n=0}^{N-1} \underline{x}_k[n] \cdot w_{k,0}^*[n] \cdot p_k^*[n] \quad (30)$$

wherein l=0 for the pilot channel.

To determine this correlation, consider the following expectation value:

$$\sum_{m=0}^{N-1} E[\underline{x}_k[m] \cdot \underline{x}_k[m]^H] \quad (31)$$

and noting that:

$$E[P_i[n] \cdot P_{i'}[n']] = \delta_{i,i'} \cdot \delta_{n,n'} \quad (32)$$

wherein P is the PN code, i is the user index associated with the PN code, j is the index of the Walsh code, and δ is defined as:

$$\delta_{i,j} = 1 \text{ if } i=j, \text{ and else is equal to } 0. \quad (33)$$

The value of x(t) is developed as follows:

$$\underline{r}(t) = \sum_i \sum_j \sum_n d_{i,j} \cdot w_{i,j}[n] \cdot p_i[n] \cdot \underline{c}_i \cdot h(t - \tau_1 - nT_c) + \underline{v}(t) \quad (34)$$

wherein i is the user or transmitter index, i.e., the PN code index in a CDMA system with unique PN codes associated with each transmitter, j is the receiver index, i.e., the Walsh code index in a CDMA system with Walsh code assignment to the receiver, n is a time index, d is the data symbol for the jth channel of user i, w is the Walsh code for the jth channel of user i, p is the PN code which is the same for all channels of user i, $\underline{c}_i$ is the spatial signature of the channel wherein $\underline{c}_i$ is the same for all channels j of a user i. One of the channels j corresponds to the pilot channel. The last term corresponds to noise. Note that in one embodiment, for a Forward Link, FL, system I corresponds to a base station and j corresponds to the Walsh channels. In an alternate embodiment, for a Reverse Link, RL, system, I corresponds to a mobile station and j corresponds to the parallel Walsh channels transmitted by that mobile station.

Based on the relationship of equation (34), the data samples are defined as:

$$\underline{x}(t) = \underline{r}(t) \otimes h^*(-t) \quad (35)$$

wherein $\otimes$ represents convolution. Further, by substitution, equation (53) becomes:

$$\underline{x}(t) = \sum_i \sum_j \sum_n d_{i,j} \cdot w_{i,j}[n] \cdot p_i[n] \cdot \underline{c}_i \cdot q(t - \tau_i - nT_c) + \underline{z}(t) \quad (36)$$

wherein $q(t) = h(t) \otimes h^*(-t)$ and $\underline{z}(t) = \underline{v}(t) \otimes h^*(-t)$. Here Tc is the chip period and $\tau_k$ is an offset for the kth path. The sample definition thus reduces to:

$$\underline{x}_k[m] = \underline{x}(mT_c + \tau_k) \quad (37)$$

or:

$$\underline{x}_k[m] = \sum_i \sum_j \sum_n d_{i,j} \cdot w_{i,j}[n] \cdot p_i[n] \cdot \underline{c}_i \cdot q(mT_c - nT_c + \tau_k - \tau_i) + \quad (38)$$

$$z(mT_c + \tau_k)$$

wherein m is a time index.

Returning to equation (31), the following relationship is derived:

$$\sum_{m=0}^{N-1} E[x_k[m] \cdot x_k[m]^H] = N \sum_i c_i \cdot c_i^H \cdot \sum_j |d_{i,j}|^2 + N\sigma^2 I \quad (39)$$

wherein N is the length of the Walsh code and $\sigma^2$ is the variance of white noise. By assuming $q(mT_c - nT_c) = 0 \; \forall \; m \neq n$, it can be shown that:

$$E[\underline{x}_{k,l} \cdot \underline{x}_{k,l}^H] = N\left[\sigma^2 I + \sum_{i \neq k} \underline{c}_i \cdot \underline{c}_i^H \cdot \sum_{j=0}^{N-1} |d_{i,j}|^2\right]. \quad (40)$$

wherein the difference of equations (40) and (39) is the error correction term. The combiner weights for the lth subchannel of the kth user are then given as:

$$\underline{w}_{k,l} = \text{cov}(\underline{x}_{k,l})^{-1} |E[\underline{x}_{k,l}]|. \quad (41)$$

Application of an adjustment term that considers the relative energy of the pilot to other terms, results in:

$$\underline{w}_{k,l} = \frac{|d_{k,l}|}{d_{k,l}} \text{cov}(\underline{x}_{k,l})^{-1} \underline{s}_k \quad (42)$$

which provides the iterative definition of the combiner weights, i.e., the combiner weight solution. The combiner weight solution is the product of the covariance matrix of the despread signal and the spatial signature.

By application of equation (42) the spatial MMSE approach for determining combiner weights is applicable to a system wherein the pilot is transmitted concurrently with other signals, such as traffic signals.

IV. Full Matrix Inversion

In general, for a system with A antennas and L RAKE fingers per antenna, specifying the MMSE combiner weights requires computing AL complex weights (one for each antenna of each path). Consider the nth received complex sample for antenna a and path 1, wherein these samples can be calculated by a suitable interpolation and/or aligning of the I/Q baseband sample stream input to the baseband processor. In an exemplary embodiment, the samples x[m] may be generated at the CDMA chip rate (e.g. 1.2288 Mcps) or higher (e.g. 2×1.2288 Mcps), while the transmitted data symbols y[n] are at the chip rate. The chip rate samples aligned with the lth path are given as:

$$x_{a,l}[n] = s_{a,l}[n] y[n] + n_{a,l}[n] \quad (43)$$

wherein $s_{a,l}[n]$ is the desired signal complex amplitude, y[n] is the transmitted symbol stream, and $n_{a,l}[n]$ is comprised of all other additive noise (and interference) terms. It is desirable to choose the AL combiner weights $w_{a,l}$ for sample n to form the symbol estimate:

$$\hat{y}[n] = \sum_{l=1}^{L} \sum_{a=1}^{A} (w_{a,l}[n])^* x_{a,l}[n]. \quad (44)$$

By forming length AL column vectors for the received samples and combiner weights, it is possible to rewrite equation (41) as $$\underline{x}[n] = \underline{s}[n] y[n] + \underline{n}[n], \quad (45)$$

and to rewrite (42) as $$\hat{y}[n] = (\underline{w}[n])^H \underline{x}[n], \quad (46)$$

wherein $(\;)^H$ represents conjugate transpose. Assume that the channel and interference vary slowly enough that the statistics of the received signal do not change during a pilot burst. Under these assumptions it is possible to rewrite equation (31) as:

$$\underline{x}[n] = \underline{s} y[n] + \underline{n}[n]. \quad (47)$$

The (AL×1) desired signal signature vector is defined as $\underline{c} = \underline{s}$. By calculating the (AL×AL) noise autocorrelation matrix $R_{nn}$ the MMSE choice for the combiner weight vector can be written as:

$$\underline{w} = R_{nn}^{-1} \underline{c}. \quad (48)$$

Based on (31), the noise autocorrelation matrix is computed as:

$$R_{nn} = R_{xx} - R_{ss} = E[\underline{x} \bullet \underline{x}^H] - E[\underline{x}] E[\underline{x}^H] = E[\underline{x} \bullet \underline{x}^H] - \underline{c}\underline{c}^H \quad (49)$$

Thus, it is possible to determine the MMSE combiner weights upon accurate estimation of $R_{nn}$ and $\underline{c}$ and by inversion of the AL×AL matrix. Furthermore, the SNR (i.e., C/I) at the output of the MMSE combiner can be calculated as:

$$SNR = \underline{w}^H \underline{c}. \quad (50)$$

This SNR measure calculated at the terminal can be used to transmit power control and rate control information from the terminal to the base station on the reverse transmission link.

V Adaptive Algorithms

The various methods of determining combiner weights discussed hereinabove make a variety of assumptions regarding the noise and interference of as received at a receiver. According to an alternate embodiment signal estimation uses an MMSE-based dynamic algorithm, such as Least Mean Square, LMS, or Recursive Least Squares, RLS, to obtain a set of weights without any assumptions as to the correlations between different fingers. In other words, the method includes noise correlations across paths. Such methods lead to a set of weights that achieves a higher SINR than would be achieved by the MRC algorithm. The exemplary embodiment employs a CDMA waveform with a time-gated pilot transmitted at full power such as IS-856 forward link. Regardless of the specific processing per finger, the final step in operation of the rake receiver involves combining the finger outputs to produce the final symbol estimate. The following signal model is applicable for the output of a given finger just prior to the combiner and is given as:

$$x_f(k) = c_f(k) y(k) + n_f(k) \quad (51)$$

wherein:

f is the finger index of the rake receiver, f=1 to F;

k is the temporal index denoting samples spaced at chip rate in time, although in alternate embodiments it could represent any other sampling rate;

y(k) is the desired symbol;

n(k) is the interference, wherein n(k) is uncorrelated with y(k); and $c_f(k)$ can be viewed as the channel gain at the time offset of finger f.

Note that this model is sufficiently general that it can be applied to a variety of scenarios.

The noise correlation matrix is given as:

$$R_{nn}(k)=E\{N(k)N(k)^H\} \quad (52)$$

wherein:

N(k) is a vector formed by the terms $n_f(k)$ for f=1 . . . F, N(k)=

$$N(k) = \begin{bmatrix} n_1(k) \\ \vdots \\ n_F(k) \end{bmatrix}.$$

E{ } is the statistical expected value operator.

The combining operation can be viewed as a simple complex inner product between the set of weights and the set of samples coming from the F fingers:

$$\hat{y}(k)=W(k)^H X(k) \quad (53)$$

wherein

X is the F-dimensional complex vector formed by the samples of each finger at the k-th instant in time;

W is the F-dimensional complex vector of weights;

$(\ )^H$ denotes complex conjugate and transpose.

The SINR of the combined estimate of y(k) is:

$$SINR(k) = \frac{\|W(k)^H c(k)\|^2}{W(k)^H R_{nn}(k) W(k)} \quad (54)$$

where c(k) is an F dimensional complex vector containing the channel coefficients, i.e., the signature, given as:

$$c(k) = \begin{bmatrix} c_1(k) \\ \vdots \\ c_F(k) \end{bmatrix}.$$

The set of weights that maximize equation (54) is given as:

$$W(k)=[R_{nn}(k)]^{-1} c(k) \quad (55)$$

Note that the channel gains vector and the noise correlation matrix depend on k, the time index. However, in most practical scenarios (i.e., different velocities of transmitter/receiver, multipath profiles, etc.), these quantities change only slowly with respect to the chip rate. In fact, it is common to assume constancy for several thousand chips. By application of this approach, and dropping the time index of the vectors, the resultant MMSE weights are independent of k:

$$W=R_{nn}^{-1} c \quad (56)$$

The traditional MRC method avoids this inversion by using a pilot sequence having known symbols to obtain estimates of c and the diagonal terms of $R_{nn}$, i.e., the variance of the individual noises at the output of each finger. With this information and the assumption that the off-diagonal terms of $R_{nn}$ are all zero, the combiner weight for finger f can be computed as:

$$w_f = \frac{c_f}{\sigma_{wf}^2}, \quad (57)$$

where $\sigma_{wf}^2$ is the fth diagonal element of $R_{nn}$. The assumption that the off-diagonal matrix elements are zero is valid only if the offsets of the fingers are far apart. This assumption becomes less and less accurate as the fingers become proximate. In some channels where it is necessary to place fingers close to each other to collect multipath energy, application of the MRC combiner weights of equation (55) will lead to substantial performance degradation.

For improved operation it is desirable to drop this assumption and use a Mean Square Error, MSE, method based on a dynamic algorithm to compute the vector of weights. There are a variety of different ways of solving equation (56), such as direct matrix inversion, the LMS algorithm, the RLS algorithm, and variants of these.

The direct matrix inversion considers the noise correlation across paths and the full autocorrelation matrix without assumptions. The direct matrix inversion is the most accurate method of determining weight values, however, the direct matrix inversion requires complicated and complex matrix operations increasing processing time and consuming a great amount of processing power. The other methods make simplifying assumptions or use adaptive algorithms or a combination thereof that allow shortcut solutions to the matrix inversion problem. Some of these methods are more suitable for implementation in a digital receiver than others.

Under the assumption that the vector c is uncorrelated with the vector of interference N, solving equation (56) is equivalent to solving equation (58), given hereinbelow, in terms of SINR performance of the solution because both solutions only differ by a constant:

$$W=R_{XX}^{-1} c, \quad (58)$$

where $$R_{XX}(k)=E\{X(k)X(k)^H\}. \quad (59)$$

Using the RLS algorithm to compute W based on the known pilot sequence that is time division multiplexed with the unknown data, the adaptive algorithm will change the filter coefficients during the pilot bursts, and the weights would be held constant for the demodulation of the data to produce the estimates of the unknown symbols. In other words, the weights are trained on the pilot bursts and the trained weights are used for processing traffic.

Note that alternate embodiments may apply other recursive algorithms for determining mean-square error, as well as alternate methods of implementing those algorithms. The RLS algorithm recursively updates the estimate $\hat{W}(k)$ at each pilot symbol based on its prior value, the input data, the know symbol and a matrix that the algorithm keeps updating as well:

$$K(k+1) = \frac{\lambda^{-1} P(k) X(k)}{1 + \lambda^{-1} X(k)^H P(k) X(h)} \quad (60)$$

$$\hat{W}(k+1) = \hat{W}(k) - K(k+1)(\hat{W}(k)^H X(k+1) - y(k+1))^* \quad (62)$$

$$P(k+1) = \lambda^{-1} P(k) - \lambda^{-1} K(k+1) X(k+1)^H P(k) \quad (63)$$

wherein:

P is an F×F complex matrix approximately equivalent to the inverse of the covariance matrix, K is an F×1 complex column vector gain term applied to iterations of the weight calculations, and λ is a real number smaller or equal than one.

The symbol * denotes complex conjugate.

The K( ) is a gain term applied to weight updates, as indicated in equation (60). The gain term K( ) is a function of λ which is a history gain factor for the algorithm, the history gain determines an amount of past iterative information maintained by the algorithm.

Under suitable conditions, the combining coefficient vector $\hat{W}(k)$ will converge to the W defined in equation (58). Simulations have shown that this MMSE approach for selecting combiner weights provides important performance advantages over the MRC approach. The gains can be significant, particularly when fingers are spaced within a few chips and/or the predominant component of the interference at a given finger stems from multipath rather than additive thermal noise or other user interference.

Figure 15A:
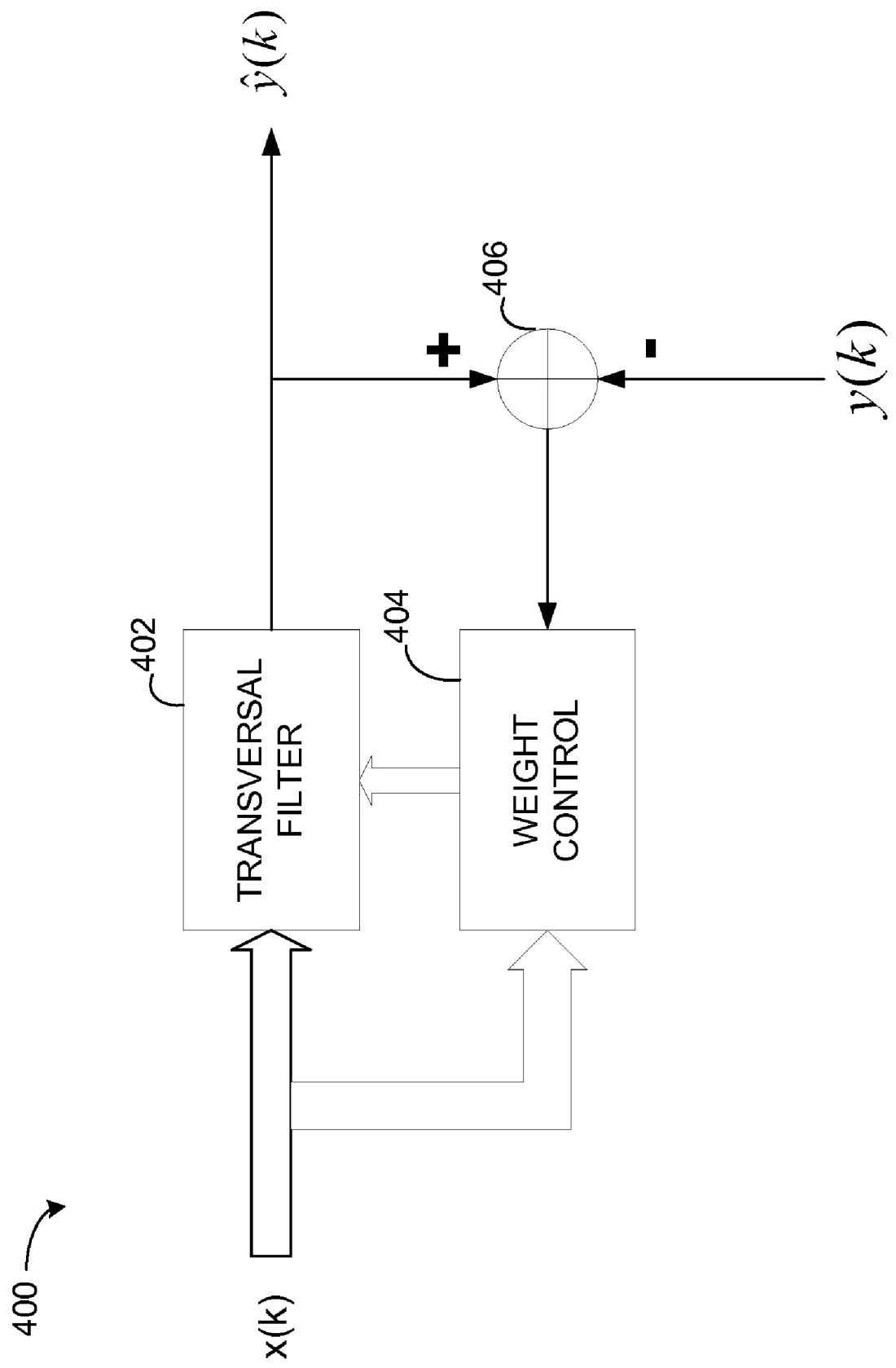
FIGS. 15A, 15B, and 15C are an adaptive filter and method for determining combiner weights.
Figure 15B:
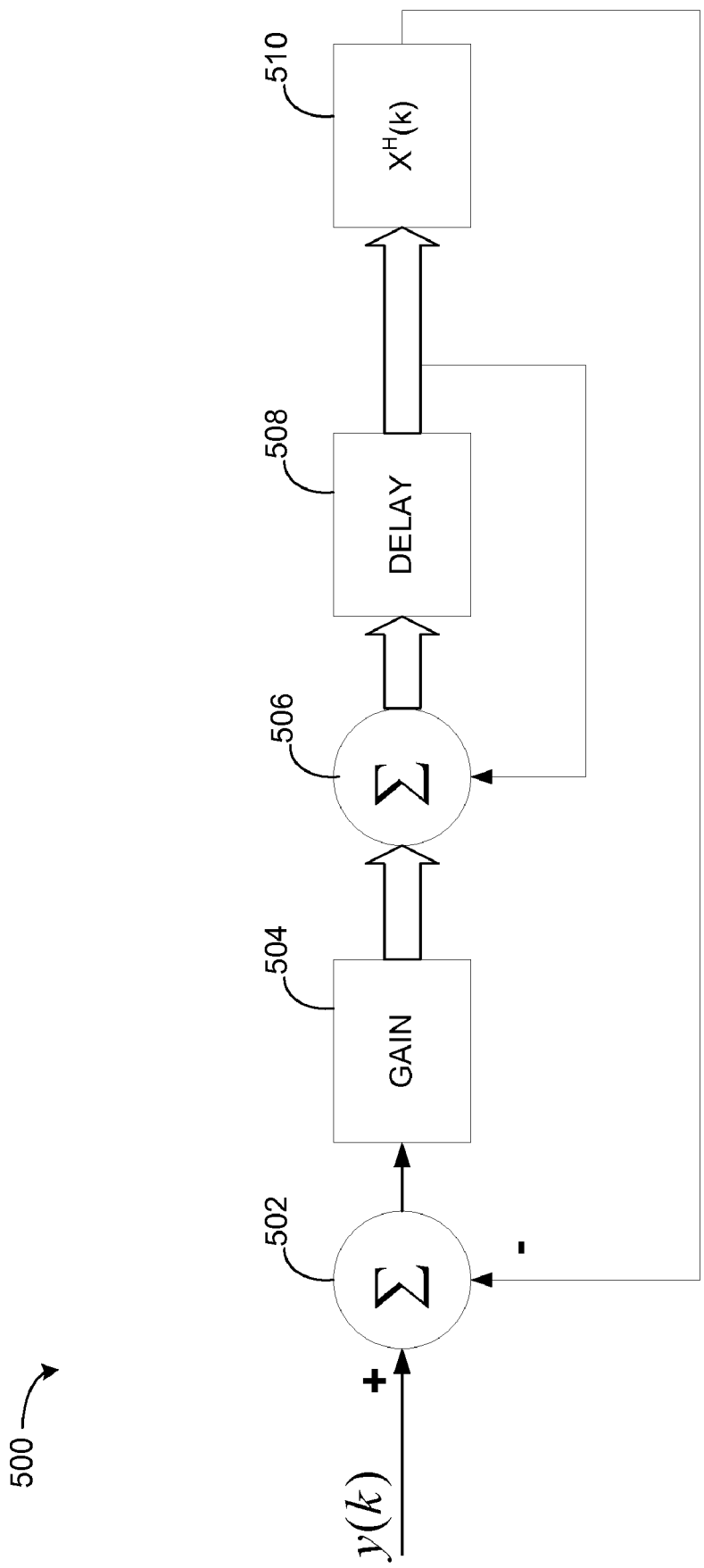
Figure 15C:
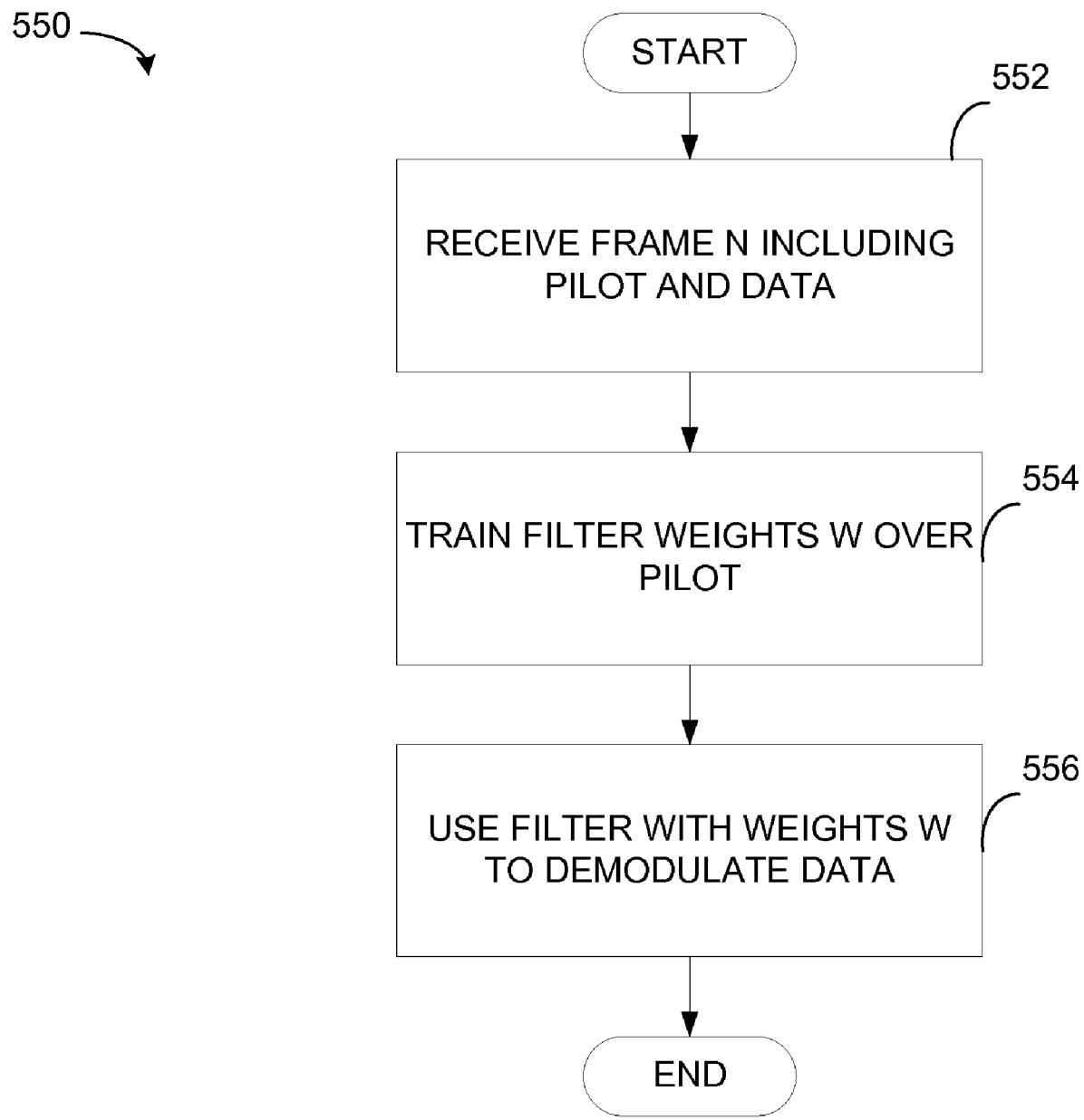

In one embodiment, illustrated in FIGS. 15A, 15B and 15C, an RLS algorithm is applied to an adaptive transversal filter such that given the least-squares estimate of the weight vector of the filter (i.e., vector of tap weights) at iteration n−1, the updated estimate is computed for iteration n upon arrival of new inputs. An important feature of the RLS algorithm is the utilization of information contained in the input data extending back to the instant of time when the algorithm is initiated. The resulting rate of convergence is therefore typically an order of magnitude faster than the simple LMS algorithm.

As illustrated in FIG. 15A, the system 400 includes a transversal filter 402 coupled to a weight control unit 404. For input x(k) the transversal filter 402 applies a weight vector W(k−1), wherein the weight vector includes weights assigned to the various taps of the transversal filter 402. The input x(k) is also provided to a weight control unit 404 for adapting the weights of the weight vector according to the algorithm. The output of the transversal filter 402 is then the application of the weights to the input x(k), wherein the output of the transversal filter 402 is provided to a summing node 406. The summing node receives the desired signal and subtracts the output of the transversal filter 402 to provide an error signal to the weight control unit 404. The weight control unit 404 uses this information as applied to the RLS algorithm and updates the weights for the taps of the transversal filter 402. Note that according to one embodiment, the weight control unit 404 trains using a time-gated pilot signal, wherein the updates to the tap weights occur during the pilot interval.

FIG. 15B illustrates a signal-flow graph 500 for the system 400 of FIG. 15A. The desired response, y*(k), provided to summation node 502. The summation node 502 determines the difference between the output of the transversal filter 402 and the desired response y*(k). The flow-graph considers a unity negative feedback configuration, wherein the output of the transversal filter 402, the filtered input in the form $x^H(k)$·W(k−1), is subtracted at summation node 502 and provided as part of the input with the desired signal y*(k). At node 504, a gain K(k) is applied to the output of summation node 402, i.e, the difference of $X^H(k)$·W(k) and y*(k), and the result of node 504 is provided to summation node 506. Node 506 also receives a pervious iteration of version of the weight vector W(k−1), and generates a next iteration of the weight vector, W(k). The output of node 506 is provided to delay element 508 for generation of W(k−1). As this is an iterative process, the output of delay element 508 is a weight vector that is provided to node 510 for application to the input data, specifically $X^H(k)$·W(k−1). The node 510 represents the operation of transversal filter 402, wherein the other operations performed in the flow-graph are performed by weight control unit 404. The RLS algorithm applied as in FIGS. 15A and 15B adaptively update the weights of the transversal filter 402 by incrementing an old value by use of an error term with gain.

The RLS method is further illustrated in FIG. 15C, wherein process 550 starts by receiving a frame n including pilot and traffic information at step 552. The filter is trained to determine the weights to apply in the filter by using the pilot symbols at step 554. The filter then uses the weights to demodulate the traffic, including data information. The training involves application of the RLS equations provided hereinabove to determine a new weight vector on each iteration of the algorithm. Alternate embodiments may use alternate adaptive algorithms, wherein the weights of the filter are adjusted iteratively without requiring complex matrix inversion.

Figure 16:
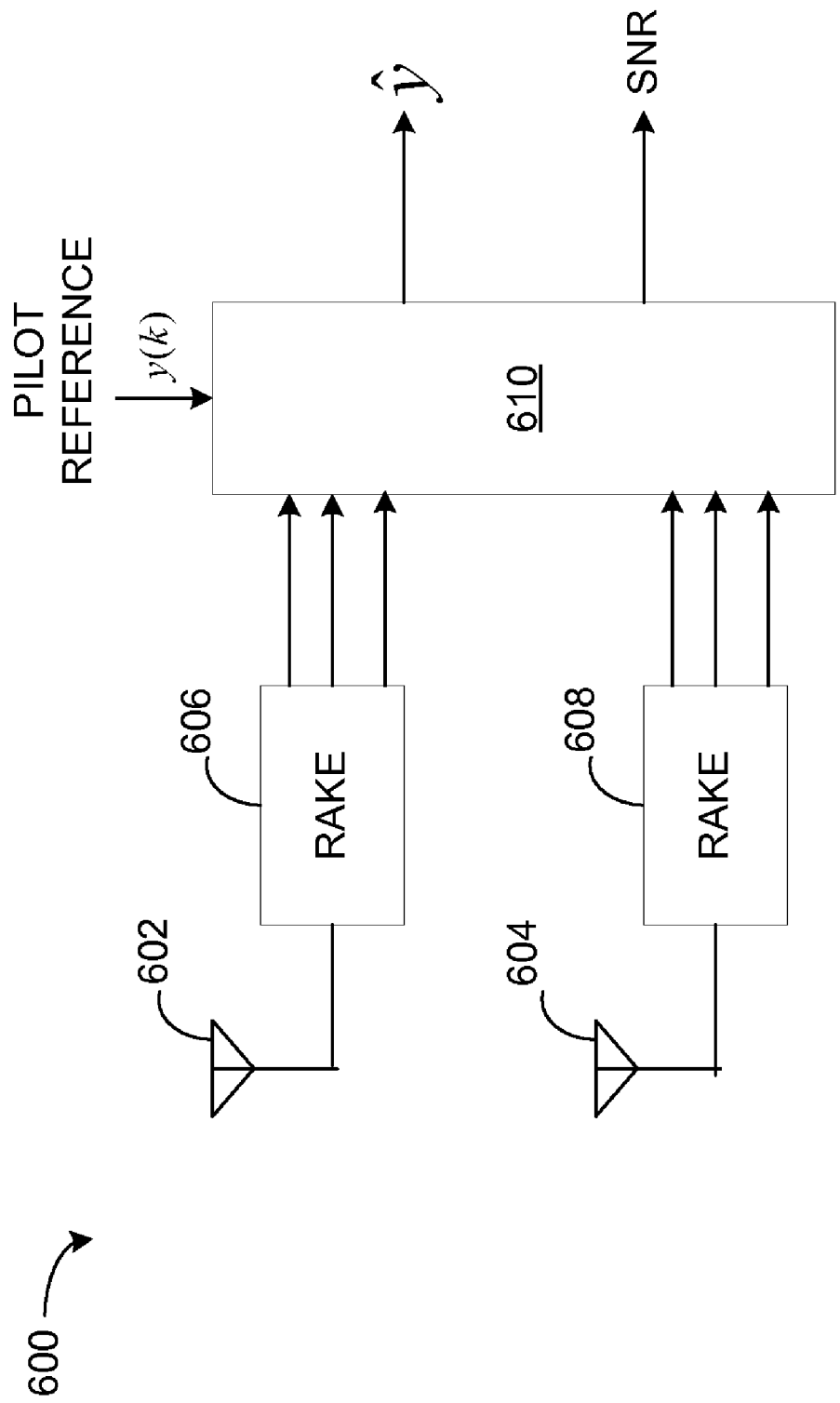
FIG. 16 is a receiver in a wireless communication system.

A system implementing an RLS algorithm for a spread spectrum system is illustrated in FIG. 16, having two antennas 602, 604 each coupled to a rake type receiver 606, 608, respectively. Each of rake receivers 606, 608 is illustrated as having three fingers for processing received signals. The outputs of rake receivers 606, 608 are provided to estimation unit 610. Estimation unit 610 also receives a pilot reference y(k). The estimation unit 610 processes the signals received from rake receivers 606, 608 by combining the signals received on each path. Each path is weighted prior to combination with the weighted signals from other paths. The adjustment of these combiner weights is performed using the RLS algorithm. The estimation unit 610 uses a signal that is known a priori to train the combiner weights. The output of estimation unit 610 is the estimate $\hat{y}(n)$ and an estimate of the SNR of the received signal. Alternate embodiments may implement alternate adaptive algorithms for determining combiner weights, wherein the algorithm seeks to minimize the mean square error between the estimated signal and the transmitted signal.

Thus a variety of methods have been illustrated hereinabove for determining combiner weights. Each method finds application according to the design and resource requirements of a given system. A trade-off exists between accuracy and computational complexity, i.e., cost. The various methods and wireless systems described hereinabove provide improved accuracy while reducing the computational complexity. While the various embodiments have been described with reference to a CDMA type spread spectrum communication system, the concepts are applicable to alternate spread spectrum type systems, as well as other type communication systems. The methods and algorithms presented hereinabove may be implemented in hardware, software, firmware, or a combination thereof. For example, using the MMSE approach to a non-time gated pilot, the equations for solving for the combiner weights may be performed in software or using a Digital Signal Processor, DSP, to perform the calculations. Similarly, the adaptive algorithms may be implemented in software in the form of computer readable instructions stored on a computer readable medium. A Central Processing Unit, such as a DSP core, operates to perform the instructions and provide signal estimates in response. Alternate embodiments may implement hardware, such as an Application Specific Integrated Circuit, ASIC, where feasible.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be an integral part of the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system having a plurality of receive antennas, each coupled to a rake receiver, and a combiner for combining signals from rake fingers of each rake receiver, a method for determining combiner weights applied in the combiner, comprising:
   receiving a frame comprising samples of a first type of symbols from a plurality of rake receiver outputs and samples of a second type of symbols from the plurality of rake receiver outputs;
   determining combiner weights for combining the plurality of rake receiver outputs using the samples of the first type of symbols using an adaptive algorithm, wherein each combiner weight is a function of a gain factor determining an amount of past iterative information maintained by the algorithm; and
   processing the samples of the second type of symbols using the combiner weights.

2. The method of claim 1, wherein the determining comprises:
   filtering the samples of the first type of symbols using a transversal filter having a plurality of taps, wherein the combiner weights are applied to the plurality of taps.

3. The method of claim 2, wherein the determining further comprises:
   determining an error between desired symbols and filtered samples of the first type of symbols, wherein the error is used to determine combiner weights.

4. The method of claim 1, wherein the first type of symbols corresponds to a pilot signal and the second type of symbols corresponds to a data signal time multiplexed with the pilot signal.

5. An apparatus in a wireless communication system having a plurality of receive antennas, each coupled to a rake receiver, and a combiner for combining signals from rake fingers of each rake receiver, the apparatus comprising:
   means for receiving a frame comprising samples of a first type of symbols from a plurality of rake receiver outputs and samples of a second type of symbols from the plurality of rake receiver outputs;
   means for determining combiner weights for combining the plurality of rake receiver outputs using the samples of the first type of symbols using an adaptive algorithm, wherein each combiner weight is a function of a gain factor determining an amount of past iterative information maintained by the algorithm; and
   means for processing the samples of the second type of symbols using the combiner weights.

6. The apparatus of claim 5, wherein the means for determining comprises:
   means for filtering the samples of the first type of symbols using a transversal filter having a plurality of taps, wherein the combiner weights are applied to the plurality of taps.

7. The apparatus of claim 6, wherein the means for determining further comprises:
   means for determining an error between desired symbols and filtered samples of the first type of symbols, wherein the error is used to determine combiner weights.

8. An apparatus in a wireless communication system having a plurality of receive antennas, each coupled Lu a rake receiver, and a combiner for combining signals from rake fingers of each rake receiver, the apparatus comprising:
   a receiver configured to receive a frame comprising samples of a first type of symbols from a plurality of rake receiver outputs and samples of a second type of symbols from the plurality of rake receiver outputs;

a determining circuit configured to determine combiner weights for combining the plurality of rake receiver outputs using the samples of the first type of symbols using an adaptive algorithm, wherein each combiner weight is a function of a gain factor determining an amount of past iterative information maintained by the algorithm; and a processor configured to process the samples of the second type of symbols using the combiner weights.

9. The apparatus of claim 8, wherein the determining circuit comprises:
a transversal filter having a plurality of taps, the tilter being configured filter the samples of the first type of symbols, wherein the combiner weights are applied to the plurality of taps.

10. The apparatus of claim 9, wherein the determining circuit further comprises:
circuitry configured to determine an error between desired symbols and filtered samples of the first type of symbols, wherein the error is used to determine combiner weights.

11. A computer-readable medium having instructions for determining combiner weights applied in a combiner of a wireless communication system having a plurality of receive antennas, each coupled to a rake receiver, and the combiner for combining signals .from rake fingers of each rake receiver, the instructions comprising:
instructions for causing a computer to receive a frame comprising samples of a first type of symbols from a. plurality of rake receiver outputs and samples of a second type of symbols from the plurality of rake receiver outputs;
instructions for causing the computer to determine combiner weights for combining the plurality of rake receiver outputs using the samples of the first type of symbols using an adaptive algorithm, wherein each combiner weight is a function of a gain factor determining an amount of past iterative information maintained by the algorithm; and
instructions for causing the computer to process the samples of the second type of symbols using the combiner weights.

12. The computer-readable medium of claim 11, wherein the instructions for causing the computer to determine comprise:
instructions for causing the computer to filtering filter the samples of the. first type of symbols using a transversal filter having a plurality of taps, wherein the combiner weights are applied to the plurality of taps.

13. The computer-readable medium of claim 12, wherein the instructions for causing the computer to determine comprise:
instructions for causing the computer to determining determine an error between desired symbols and filtered samples of the first type of symbols, wherein the error is used to determine combiner weights.

* * * * *